(12) United States Patent
Yin et al.

(10) Patent No.: US 12,256,393 B2
(45) Date of Patent: Mar. 18, 2025

(54) MULTIPLEXING HARQ-ACK OF DIFFERENT SERVICE TYPES ON A SINGLE PUSCH

(71) Applicant: SHARP KABUSHIKI KAISHA, Osaka (JP)

(72) Inventors: Zhanping Yin, Vancouver, WA (US); Kazunari Yokomakura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 363 days.

(21) Appl. No.: 17/630,370

(22) PCT Filed: Jul. 30, 2020

(86) PCT No.: PCT/JP2020/029350
§ 371 (c)(1),
(2) Date: Jan. 26, 2022

(87) PCT Pub. No.: WO2021/024922
PCT Pub. Date: Feb. 11, 2021

(65) Prior Publication Data
US 2022/0295473 A1    Sep. 15, 2022

Related U.S. Application Data

(60) Provisional application No. 62/882,952, filed on Aug. 5, 2019.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04L 5/0012* (2013.01);
(Continued)

(58) Field of Classification Search
CPC ............. H04W 72/21; H04W 72/0453; H04L 1/1812; H04L 5/0012; H04L 5/0051;
(Continued)

(56) References Cited

U.S. PATENT DOCUMENTS 11,451,344 B2 *  9/2022  Babaei ................. H04L 5/0092
11,800,524 B2 * 10/2023  Marinier ............... H04L 1/1854
(Continued)

OTHER PUBLICATIONS

3GPP TS 38.212 V15.6.0 (Jun. 2019), 3rd Generation Partnership Project; Technical Specification Group Radio Access Network; NR; Multiplexing and channel coding (Release 15).
(Continued)

*Primary Examiner* — Brian T O'Connor
(74) *Attorney, Agent, or Firm* — ScienBiziP, P.C.

(57) ABSTRACT

A user equipment (UE) is described. The UE includes a higher layer processor configured to determine that a physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an enhanced mobile broadband (eMBB) physical uplink shared channel (PUSCH). The higher layer processor is also configured to determine multiplexing of both URLLC UCI and eMBB UCI on the eMBB PUSCH, where the URLLC UCI starts immediately after a first set of demodulation reference symbols (DMRS) in the eMBB PUSCH. The UE also includes transmitting circuitry configured to perform the multiplexing of the URLLC UCI and the eMBB UCI jointly on the eMBB PUSCH.

5 Claims, 17 Drawing Sheets

(51) Int. Cl.
*H04L 5/00* (2006.01)
*H04W 72/0453* (2023.01)

(52) U.S. Cl.
CPC .......... *H04L 5/0051* (2013.01); *H04L 5/0053* (2013.01); *H04W 72/0453* (2013.01)

(58) Field of Classification Search
CPC ... H04L 5/0053; H04L 1/1854; H04L 1/1861; H04L 1/1671
See application file for complete search history.

(56) References Cited

U.S. PATENT DOCUMENTS 12,069,647 B2 *   8/2024   Yin ........................ H04L 1/1812
12,069,667 B2 *   8/2024   Yin ........................ H04L 5/0051

OTHER PUBLICATIONS

Intel Corporation, "On enhancements to UCI for eURLLC", R1-1906807, 3GPP TSG RAN WG1 #97, Reno, USA, May 13-17, 2019.
Etri, "UCI enhancements", R1-1907040, 3GPP TSG RAN WG1 #97, Reno, USA, May 13-17, 2019.
Huawei et al, "UL intra-UE multiplexing between control channels", R1-1907547, 3GPP TSG RAN WG1 Meeting #97, Reno, USA, May 13-17, 2019.

* cited by examiner

MULTIPLEXING HARQ-ACK OF DIFFERENT SERVICE TYPES ON A SINGLE PUSCH

TECHNICAL FIELD

The present disclosure relates generally to communication systems. More specifically, the present disclosure relates to multiplexing HARQ-ACK of different service types on a single physical uplink shared channel (PUSCH).

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a higher layer processor configured to determine that a physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an eMBB physical uplink shared channel (PUSCH); the higher layer processor configured to determine multiplexing of both URLLC UCI and eMBB UCI on the eMBB PUSCH, where the URLLC UCI starts immediately after a first set of demodulation reference symbols (DMRS) in the eMBB PUSCH; and transmitting circuitry configured to perform the multiplexing of the URLLC UCI and the eMBB UCI jointly on the eMBB PUSCH.

In one example, a base station (gNB), comprising: a higher layer processor configured to determine that a physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an eMBB physical uplink shared channel (PUSCH); the higher layer processor configured to determine multiplexing of both URLLC UCI and eMBB UCI on the eMBB PUSCH, where the URLLC UCI starts immediately after a first set of demodulation reference symbols (DMRS) in the eMBB PUSCH; and receiving circuitry configured to receive the multiplexing of the URLLC UCI and the eMBB UCI jointly on the eMBB PUSCH.

In one example, a method by a user equipment (UE), comprising: determining that a physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an eMBB physical uplink shared channel (PUSCH); determining multiplexing of both URLLC UCI and eMBB UCI on the eMBB PUSCH, where the URLLC UCI starts immediately after a first set of demodulation reference symbols (DMRS) in the eMBB PUSCH; and performing the multiplexing of the URLLC UCI and the eMBB UCI jointly on the eMBB PUSCH.

In one example, a method by a base station (gNB), comprising: determining that physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an eMBB physical uplink shared channel (PUSCH); determining multiplexing of both URLLC UCI and eMBB UCI on the eMBB PUSCH, where the URLLC UCI starts immediately after a first set of demodulation reference symbols (DMRS) in the eMBB PUSCH; and receiving the multiplexing of the URLLC UCI and the eMBB UCI jointly on the eMBB PUSCH.

DESCRIPTION OF EMBODIMENTS

Figure 1:
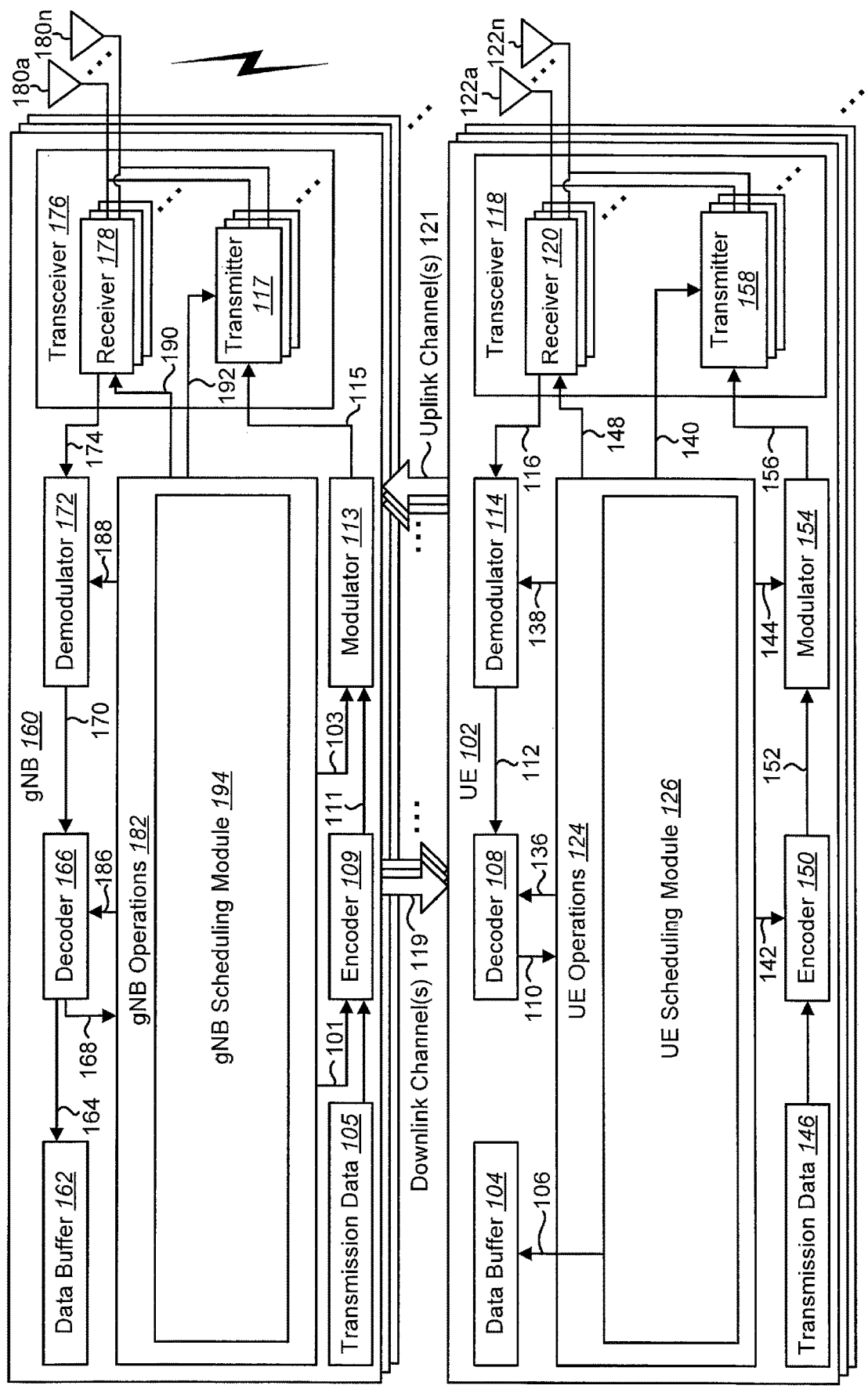
FIG. 1 is a block diagram illustrating one implementation of one or more base stations (gNBs) and one or more user equipments (UEs) in which systems and methods for multiplexing HARQ-ACK of different service types on a single physical uplink shared channel (PUSCH) may be implemented.

A user equipment (UE) is described. The UE includes a higher layer processor configured to determine that a physical uplink control channel (PUCCH) for hybrid automatic repeat request-acknowledgment (HARQ-ACK) of ultra-reliable low-latency communication (URLLC) and a PUCCH for uplink control information (UCI) of enhanced mobile broadband (eMBB) overlap with an eMBB physical uplink shared channel (PUSCH). The higher layer processor is also configured to determine multiplexing of both URLLC uplink control information (UCI) and eMBB UCI on the eMBB PUSCH, where the URLLC UCI starts immediately after a first set of demodulation reference symbols (DMRS) in the eMBB PUSCH. The UE also includes transmitting circuitry configured to perform the multiplexing of the URLLC UCI and the eMBB UCI jointly on the eMBB PUSCH.

URLLC HARQ-ACK and eMBB HARQ-ACK and/or channel state information (CSI) multiplexing may start immediately after the first set of DMRS in the eMBB PUSCH. A HARQ-ACK payload may be calculated based on a total payload of the URLLC HARQ-ACK and the eMBB HARQ-ACK. If there is one bit of URLLC HARQ-ACK and one bit of eMBB HARQ-ACK, HARQ-ACK multiplexing may treat multiplexed bits of the URLLC HARQ-ACK and eMBB HARQ-ACK as two bits of URLLC HARQ-ACK and the number of symbols on the eMBB PUSCH for the HARQ-ACK multiplexing is calculated with a beta offset value configured for the URLLC HARQ-ACK. If both URLLC HARQ-ACK and eMBB HARQ-ACK are present, the HARQ-ACK payload may be determined assuming two bits of URLLC HARQ-ACK and 2 bits of eMBB HARQ-ACK.

If the total HARQ-ACK bits is more than 2, for UCI multiplexing on the eMBB PUSCH, the URLLC HARQ-ACK and eMBB HARQ-ACK may be coded separately. Coded bits for transmission on the eMBB PUSCH may be calculated separately based on different beta offset settings for the URLLC HARQ-ACK and the eMBB HARQ-ACK.

UCI multiplexing may occur in the following order: coded bits for URLLC HARQ-ACK are multiplexed first, followed by coded bits for eMBB HARQ-ACK, then coded bits for CSI. If frequency hopping is configured for the PUSCH, the coded bits for URLLC HARQ-ACK may be multiplexed in the first hop only. The number of coded HARQ-ACK bits may be determined by the maximum between the coded bits for URLLC HARQ-ACK and half of the total coded HARQ-ACK bits of URLLC and eMBB.

A base station (gNB) is also described. The gNB includes a higher layer processor configured to determine that a PUCCH for HARQ-ACK of URLLC and a PUCCH for UCI of eMBB overlap with an eMBB PUSCH. The higher layer processor is also configured to determine multiplexing of both URLLC UCI and eMBB UCI on the eMBB PUSCH. The URLLC UCI starts immediately after a first set of DMRS in the eMBB PUSCH. The gNB also includes receiving circuitry configured to receive the multiplexing of the URLLC UCI and the eMBB UCI jointly on the eMBB PUSCH.

A method by a UE is also described. The method includes determining that a PUCCH for HARQ-ACK of URLLC and a PUCCH for UCI of eMBB overlap with an eMBB physical uplink shared channel (PUSCH). The method also includes determining multiplexing of both URLLC UCI and eMBB UCI on the eMBB PUSCH. The URLLC UCI starts immediately after a first set of DMRS in the eMBB PUSCH. The method further includes performing the multiplexing of the URLLC UCI and the eMBB UCI jointly on the eMBB PUSCH.

A method by a gNB is also described. The method includes determining that a PUCCH for HARQ-ACK of URLLC and a PUCCH for UCI of eMBB overlap with an eMBB physical uplink shared channel (PUSCH). The method also includes determining multiplexing of both URLLC UCI and eMBB UCI on the eMBB PUSCH. The URLLC UCI starts immediately after a first set of DMRS in the eMBB PUSCH. The method further includes receiving the multiplexing of the URLLC UCI and the eMBB UCI jointly on the eMBB PUSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In 5G NR, different services can be supported with different quality of service (QoS) requirements (e.g., reliability and delay tolerance). For example, eMBB may be targeted for high data rate, and URLLC may be used for ultra-reliability and low latency. To provide ultra-reliability for URLLC traffic, the HARQ-ACK of a URLLC PDSCH transmission may have much higher reliability than the HARQ-ACK feedback of eMBB. Furthermore, URLLC HARQ-ACK feedback may have much shorter processing time and feedback timing than eMBB. Therefore, the current HARQ-ACK multiplexing method on PUSCH may not be suitable for URLLC HARQ-ACK reporting on eMBB PUSCH.

UCI multiplexing methods of eMBB HARQ-ACK and URLLC HARQ-ACK on a single PUSCH are discussed herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) and one or more user equipments (UEs) in which systems and methods for multiplexing HARQ-ACK of different service types on a single physical uplink shared channel (PUSCH) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, nonURLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform PUCCH and PUSCH configuration as described herein. For overlapping URLLC PUCCH and eMBB PUSCH transmission, URLLC uplink control information (UCI) multiplexing on eMBB PUSCH may be supported. In an example, URLLC UCI multiplexing on eMBB PUSCH may be useful if simultaneous PUCCH and PUSCH transmission is not configured or not supported.

URLLC UCI multiplexing may start from overlapping symbols between PUCCH and eMBB PUSCH (Approach 1), or between the subslot containing the URLLC PUCCH and the eMBB PUSCH (Approach 2). URLLC UCI is multiplexed from a symbol that is immediately after a DMRS if the timing requirements are satisfied. URLLC UCI multiplexing may be performed in one continuous set of symbols, no UCI segmentation is performed even if frequency hopping is configured. If frequency hopping is configured, the URLLC UCI multiplexing may be performed in only one hop.

For a case that URLLC HARQ-ACK and eMBB HARQ-ACK multiplexing is on a single PUSCH, different methods are described. In a first method (Method 1), the coded bits for eMBB UCI, including HARQ-ACK and CSI, are multiplexed on eMBB PUSCH first. The URLLC HARQ-ACK is multiplexed independently by puncturing PUSCH with eMBB UCI.

In a second method (Method 2), the URLLC HARQ-ACK multiplexing on PUSCH conditions may be restricted to the case where the URLLC HARQ-ACK and eMBB HARQ-ACK and/or CSI multiplexing always start immediately after the first set of DMRS in a PUSCH. If both HARQ-ACK of URLLC and HARQ-ACK of eMBB are present, for HARQ-ACK multiplexing, the HARQ-ACK payload may be calculated based on the total payload of URLLC HARQ-ACK and eMBB HARQ-ACK. This method is described in more detail below.

Regarding UCI multiplexing on PUSCH in NR Release-15 (Rel-15), uplink control information (UCI) may include HARQ-ACK and CSI. The PUCCH resources for periodic CSI may be configured semi-statically. The PUCCH resource sets for HARQ-ACK may be configured by higher layer signaling, and the PUCCH resource for HARQ-ACK reporting may be determined by explicit signaling with HARQ-ACK resource indication (ARI) bits in the DCI format.

If a PUCCH resource for UCI transmission overlaps with a scheduled PUSCH transmission in time, a collision occurs. In Rel-15, simultaneous PUCCH and PUSCH transmission is not supported. Thus, UCI multiplexing is supported under certain conditions of timing requirements. In a case that the timing requirements are not satisfied, the case is treated as an error case, no specific UE behavior is defined, and it is up to UE implementation to handle it.

Different beta offset values may be configured for different types of UCI (e.g., HARQ-ACK, CSI part 1 and CSI part 2). The number of REs used for the UCI multiplexing may be calculated based on the UCI payload, the beta offset value and the parameters of the PUSCH where the UCI is multiplexed on.

For UCI multiplexing on PUSCH, different behaviors may be defined based on the UCI type and payload sizes. In a first case, UCI carrying HARQ-ACK feedback with 1 or 2 bits may be multiplexed by puncturing PUSCH. The REs for up to 2 bits of HARQ-ACK may be reserved with a distributed RE mapping assuming 2 bits of HARQ-ACK. In all other cases, UCI (more than 2 bits of HARQ-ACK, or a CSI) is multiplexed by rate matching on the PUSCH.

Furthermore, if frequency hopping is configured for the PUSCH, the UCI can be multiplexed on both hops after the first set of DMRS(s) in each hop. If frequency hopping is not configured, the UCI may be multiplexed after the first set of DMRS(s).

The number of DMRS(s) in a PUSCH may depend on the PUSCH duration, PUSCH mapping types, the DMRS configuration types, single-symbol DMRS or double symbol DMRS, etc. For example, for PUSCH DMRS positions within a slot for single-symbol DMRS and intra-slot frequency hopping disabled, configured, the number of DMRS in a slot ranges from 1 to 4 depending on the PUSCH duration. If intra-slot frequency hopping is enabled, 1 or 2 DMRS may be present depending on the duration of a hop.

The UCI multiplexing on PUSCH in Rel-15 may start after the first continuous set of DMRS in a slot. In the case that intra-slot frequency hopping is enabled for HARQ-ACK and CSI, the coded UCI bits may be segmented into two parts, and UCI multiplexing of each part may start after the first continuous set of DMRS in each hop.

The coded bits for an uplink shared channel (UL-SCH) may be denoted as $$g_0^{UL-SCH}, g_1^{UL-SCH}, g_3^{UL-SCH}, \ldots, g_{G^{UL-SCH}-1}^{UL-SCH}$$

The coded bits for HARQ-ACK, if any, may be denoted as $$g_0^{ACK}, g_1^{ACK}, g_2^{ACK}, g_3^{ACK}, \ldots, g_{G^{ACK}-1}^{ACK}$$

The coded bits for CSI part 1, if any, may be denoted as $$g_0^{CSI-part1}, g_1^{CSI-part1}, g_3^{CSI-part1}, \ldots, g_{G^{CSI-PART1}-1}^{CSI-PART1}$$

The coded bits for CSI part 2, if any, may be denoted as $G^{ACK}(1) = N_L \cdot Q_m \cdot \lceil G^{ACK}/(2 \cdot N_L \cdot Q_M) \rceil$ The multiplexed data and control coded bit sequence may be denoted as $g_0, g_1, g_2, g_3, \ldots, g_{G-1}$ l may be denoted as the OFDM symbol index of the scheduled PUSCH, starting from 0 to $N_{symb,all}^{PUSCH}-1$, where $N_{symb,all}^{PUSCH}$ is the total number of OFDM symbols of the PUSCH, including all OFDM symbols used for DMRS.

k may be denoted as the subcarrier index of the scheduled PUSCH, starting from 0 to $M_{sc}^{PUSCH}-1$, where $M_{sc}^{PUSCH}-1$ is expressed as a number of subcarriers.

$\Phi_l^{UL-SCH}$ may be denoted as the set of resource elements, in ascending order of indices k, available for transmission of data in OFDM symbol l, for l=0, 1, 2, ..., $N_{symb,all}^{PUSCH}-1$. symb,all $M_{sc}^{UL-SCH}(l) = |\Phi_l^{UL-SCH}|$ may be denoted as the number of elements in set $\Phi_l^{UCI}$, $\Phi_l^{UL-SCH}$, $\Phi_l^{UL-SCH}$ (j) may be denoted as the j-th element in $\Phi_l^{UL-SCH}$. $\Phi_l^{UCI}$ may be denoted as the set of resource elements, in ascending order of indices k, available for transmission of UCI in OFDM symbol l, for l=0, 1, 2, ..., $N_{symb,all}^{PUSCH}-1$. $M_{sc}^{UCI}(l) = |\Phi_l^{UCI}|$ may be denoted as the number of elements in set $\Phi_l^{UCI}$. $\Phi_l^{UCI}$ (j) may be denoted as the j-th element in $\Phi_l^{UCI}$. For any OFDM symbol that carriers DMRS of the PUSCH, $\Phi_l^{UCI} = \emptyset$. For any OFDM symbol that does not carry DMRS of the PUSCH, $\Phi_l^{UCI} = \Phi_l^{UL-SCH}$.

If frequency hopping is configured for the PUSCH,
  denote $l^{(1)}$ as the OFDM symbol index of the first OFDM symbol after the first set of consecutive OFDM symbol(s) carrying DMRS in the first hop;
  denote $l^{(2)}$ as the OFDM symbol index of the first OFDM symbol after the first set of consecutive OFDM symbol(s) carrying DMRS in the second hop;
  denote $l_{CSI}^{(1)}$ as the OFDM symbol index of the first OFDM symbol that does not carry DMRS in the first hop; and
  denote $l_{CSI}^{(2)}$ as the OFDM symbol index of the first OFDM symbol that does not carry DMRS in the second hop.

If HARQ-ACK is present for transmission on the PUSCH with UL-SCH, let $G^{ACK}(1) = N_L \cdot Q_m \cdot \lceil G^{ACK}/(2 \cdot N_L \cdot Q_m) \rceil$; and $G^{ACK}(2) N_L \cdot Q_m \cdot \lceil G^{ACK}/(2 \cdot N_L \cdot Q_m) \rceil$.

If CSI is present for transmission on the PUSCH with UL-SCH, let $G^{CSI-part1}(1) = N_L \cdot Q_m \cdot \lceil G^{CSI-part1}/(2 \cdot N_L \cdot Q_m) \rceil$;

$G^{CSI-part1}(2) = N_L \cdot Q_m \cdot \lceil G^{CSI-part1}/(2 \cdot N_L \cdot Q_m) \rceil$;

$G^{CSI-part1}(1) = N_L \cdot Q_m \cdot \lceil G^{SCI-part2}/(2 \cdot N_L \cdot Q_m) \rceil$; and $G^{CSI-part2}(2) = N_L \cdot Q_m \cdot \lceil G^{SCI-part2}/(2 \cdot N_L \cdot Q_m) \rceil$.

If only HARQ-ACK and CSI part 1 are present for transmission on the PUSCH without UL-SCH, let $G^{ACK}(1) = \min(N_L \cdot Q_m \cdot \lceil G^{ACK}/(2 \cdot N_L \cdot Q_m) \rceil, M_3 \cdot N_L \cdot Q_m)$;

$G^{ACK}(2) = G^{ACK} - G^{ACK}(1)$;

$G^{CSI-part1}(1) = m_1 \cdot N_L \cdot Q_m - G^{ACK}(1)$; and $G^{CSI-part1}(2) = G^{SCI-part1} - G^{SCI-part1}(1)$.

If HARQ-ACK, CSI part 1 and CSI part 2 are present for transmission on the PUSCH without UL-SCH, let $G^{ACK}(1) = \min(N_L Q_m \cdot \lceil G^{ACK}/(2 \cdot N_L \cdot Q_m) \rceil M_3 \cdot N_L \cdot Q_m)$; and $G^{ACK}(2) = G^{ACK} - G^{ACK}(1)$.

If the number of HARQ-ACK information bits is more than 2, $$G^{CSI-part1}(1) = \min\left(\begin{array}{c} N_L \cdot Q_m \cdot \lfloor G^{CSI-part1}/(2 \cdot N_L \cdot Q_m) \rfloor, \\ M_1 \cdot N_L \cdot Q_m - G^{ACK}(1) \end{array}\right);$$

otherwise, $$G^{CSI-part1}(1) = \min\left(\begin{array}{c} N_L \cdot Q_m \cdot \lfloor G^{CSI-part1}/(2 \cdot N_L \cdot Q_m) \rfloor, \\ M_1 \cdot N_L \cdot Q_m - G_{rvd}^{ACK}(1) \end{array}\right);$$

$G^{CSI-part1}(2) = G^{CSI-part1} - G^{CSI-part1}(1)$;

$G^{CSI-part2}(1) = M_1 \cdot N_L \cdot Q_m - G^{CSI-part1}(1)$ if the number of HARQ-ACK information bits is no more than 2, and $G^{CSI-part2}(1) = M_1 \cdot N_L \cdot Q_m - G^{ACK}(1) - G^{CSI-part1}(1)$ otherwise; and $G^{CSI-part2}(2) = M_2 \cdot N_L \cdot Q_m - G^{CSI-part1}(2)$ if the number of HARQ-ACK information bits is no more than 2, and $G^{CSI-part2}(2) M_2 \cdot N_L \cdot Q_m - G^{ACK}(2) - G^{CSI-part1}(2)$ otherwise.

If CSI part 1 and CSI part 2 are present for transmission on the PUSCH without UL-SCH, let $$G^{CSI-part1}(1) = \min\left(\begin{array}{c} N_L \cdot Q_m \cdot \lfloor G^{CSI-part1}/(2 \cdot N_L \cdot Q_m) \rfloor, \\ M_1 \cdot N_L \cdot Q_m - G_{rvd}^{ACK}(1) \end{array}\right);$$

$G^{CSI-part1}(2) = G^{CSI-part1} - G^{CSI-part1}(1)$;

$G^{CSI-part2}(1) = M_1 \cdot N_L \cdot Q_m - G^{CSI-part1}(1)$; and $G^{CSI-part2}(2) = M_2 \cdot N_L \cdot Q_m - G^{CSI-part1}(2)$.

Let $N_{hop}^{PUSCH} = 2$, and denote $N_{symb,hop}^{PUSCH}(1)$, $N_{symb,hop}^{PUSCH}(2)$ as the number of OFDM symbols of the PUSCH in the first and second hop, respectively.

$N_L$ is the number of transmission layers of the PUSCH. $Q_m$ is the modulation order of the PUSCH.

$$M_1 = \sum_{l=0}^{N_{symb,hop}^{PUSCH}(1)-1} M_{SC}^{USCI}(l);$$

$$M_2 = \sum_{l=N_{symb,hop}^{PUSCH}(1)}^{N_{symb,hop}^{PUSCH}(1)+N_{symb,hop}^{PUSCH}(2)-1} M_{SC}^{USCI}(l);$$

$$M_3 = \sum_{l=l^{(1)}}^{N_{symb,hop}^{PUSCH}(1)-1} M_{SC}^{USCI}(l).$$

If frequency hopping is not configured for the PUSCH, denote $N_{hop}^{PUSCH} = 1$ as the OFDM symbol index of the first OFDM symbol after the first set of consecutive OFDM symbol(s) carrying DMRS;

denote $l_{CSI}^{(1)}$ as the OFDM symbol index of the first OFDM symbol that does not carry DMRS;

if HARQ-ACK is present for transmission on the PUSCH, let $$G^{ACK}(1) = G^{ACK};$$

if CSI is present for transmission on the PUSCH, let $G^{CSI\text{-}part1}(1) = G^{CSI\text{-}part1}$ and $G^{CSI\text{-}part2}(1) = G^{CSI\text{-}part2}$; and let $N_{hop}^{PUSCH} = 1$ and $N_{symb,hop}^{PUSCH}(1) = N_{symb,all}^{PUSCH}$ hop symb,hop symb,all The multiplexed data and control coded bit sequence $g_0, g_1, g_2, g_3, \ldots, g_{G-1}$ may be obtained as described in TS 38.212 Section 6.2.7.

In NR, different service types are supported (e.g., enhanced mobile broadband (eMBB) and ultra-reliable and low latency (URLLC)). To support different service types, at least two HARQ-ACK codebooks are simultaneously constructed for different service types. In an example, RNTI and/or DCI in DL assignment may be used for identifying PDSCHs for different service types (i.e., eMBB PDSCH and URLLC PDSCH). In another example, RNTI and/or DCI in DL assignment may be used for identifying HARQ-ACK codebooks for different service types (Slot-based HARQ-ACK codebook for eMBB PDSCH and Sub-slot-based HARQ-ACK codebook for URLLC).

It is assumed that a prioritization (e.g., lower priority and higher priority) is supported for PUSCH transmission for different service types. For example, RNTI and/or DCI in UL grant may be used for identifying PUSCHs for different service types (i.e., eMBB PUSCH and URLLC PUSCH).

One of the HARQ-ACK codebook can be slot based HARQ-ACK feedback (e.g., for eMBB services). In some embodiments, slot based HARQ-ACK is also called eMBB HARQ-ACK, HARQ-ACK for eMBB, type 1 HARQ-ACK, HARQ-ACK part 2, etc. The PUCCH resources for slot based HARQ-ACK is configured at slot level.

Another HARQ-ACK codebook is intended for low latency feedback (e.g., URLLC services), with PUCCH resources configured at subslot level. In some embodiments, subslot based HARQ-ACK is also called as URLLC HARQ-ACK, HARQ-ACK for URLLC, type 2 HARQ-ACK, HARQ-ACK part 1, etc.

When at least two HARQ-ACK codebooks are simultaneously constructed for supporting different service types for a UE, all Rel-16 parameters in PUCCH configuration related to HARQ-ACK feedback can be separately configured for different HARQ-ACK codebooks.

Due to ultra-reliability and low latency requirements of URLLC traffic, the UCI of URLLC traffic may use low latency fast feedback and much lower error probability. For example, the corresponding HARQ-ACK feedback for a PDSCH may be reported in a very short time compared with eMBB, and more than one URLLC HARQ-ACK may happen in an eMBB PUSCH duration.

For overlapping URLLC PUCCH and eMBB PUSCH transmission, URLLC UCI multiplexing on eMBB PUSCH should be supported, especially if simultaneous PUCCH and PUSCH transmission is not supported. The support of URLLC UCI multiplexing on eMBB PUSCH can be determined based on timing requirements, including processing time, HARQ timing indication, delay tolerance etc.

If the timing conditions cannot be satisfied, priority based channel dropping may be used (e.g., a PUCCH for URLLC HARQ-ACK may preempt the transmission of eMBB PUSCH at least in overlapping symbols). If the conditions are satisfied, URLLC UCI can be multiplexed on eMBB PUSCH.

In one method, the HARQ-ACK for URLLC can be multiplexed from any symbols on an eMBB PUSCH. For example, the URLLC HARQ-ACK is multiplexed from overlapping symbols between the URLLC PUCCH and the eMBB PUSCH, or from overlapping symbols between the subslot containing the URLLC PUCCH and the eMBB PUSCH. In this case, UCI is not multiplexed on DMRS symbols.

In another method, the HARQ-ACK for URLLC is multiplexed from a symbol that is immediately after a DMRS if the timing requirements are satisfied. Any DMRS(s) in the eMBB PUSCH may be used for URLLC UCI multiplexing on eMBB PUSCH. It does not need to be the first continuous set of DMRS in a slot or in a hop in case of frequency hopping. In the case that additional DMRS in eMBB PUSCH is configured, the addition DMRS may also be used, and UCI multiplexing may start immediately after an additional DMRS.

Furthermore, the URLLC UCI multiplexing on PUSCH may be performed in one hop only, thus no URLLC UCI segmentation is performed even if frequency hopping is configured. If frequency hopping is configured, the URLLC UCI multiplexing may be performed in one hop only. For example, the URLLC PUCCH may collide only in the second hop of the eMBB PUSCH, there is no way the URLLC UCI can be multiplexed on the first hop of the eMBB PUSCH. On the contrary, the URLLC PUCCH may collide in the first hop of an eMBB PUSCH, the UCI may not be multiplexed to the second hop due to ultra-low latency requirements.

In some cases, the HARQ-ACK for URLLC is only multiplexed from the symbol that is immediately after the first set of DMRS if the timing requirements are satisfied. That is, the starting symbol for UCI multiplexing may be the same as current eMBB UCI multiplexing. The URLLC HARQ-ACK multiplexing can be similar to eMBB HARQ-ACK. For example, if the number of URLLC HARQ-ACK is no more than 2 bits, the URLLC HARQ-ACK may be multiplexed on PUSCH by puncturing in the first hop only. If the number of URLLC HARQ-ACK is more than 2 bits, the URLLC HARQ-ACK may be multiplexed on PUSCH by rate matching in the first hop only.

URLLC HARQ-ACK and eMBB UCI multiplexing on the same PUSCH is described herein. The UCI multiplexing when the PUCCH for HARQ-ACK of URLLC and the PUCCH for HARQ-ACK of eMBB overlap with a single PUSCH is described. The order of UCI multiplexing when both HARQ-ACK for URLLC and HARQ-ACK eMBB are present is also described. Furthermore, methods to determine the coded bits for each HARQ-ACK codebook on PUSCH with and without frequency hopping are described herein.

In a first method (Method 1), Independent UCI multiplexing for URLLC and eMBB may be performed. In this method, the UCI of eMBB is multiplexed separately from the URLLC HARQ-ACK. Thus, the UCI for eMBB, including slot based HARQ-ACK and/or CSI part 1 and/or CSI part 2 are mapped using existing UCI multiplexing methods. The HARQ-ACK of URLLC is then mapped independently on the PUSCH with multiplexed UCI of eMBB. From the URLLC UCI point of view, there is no difference whether eMBB UCI is multiplexed on the PUSCH or not.

Method 1 can be applied under any timing conditions between the PUCCH for URLLC HARQ-ACK and PUSCH, especially if the HARQ-ACK for URLLC can be multiplexed from any symbols on an eMBB PUSCH. In this case, for PUSCH with or without UCI for eMBB, rate matching with UCI from URLLC is difficult because the URLLC UCI may be multiplexed from any symbol on PUSCH. Thus, the HARQ-ACK of URLLC should be multiplexed on PUSCH by puncturing. If puncturing is used for URLLC HARQ-ACK on PUSCH, the data REs on a PUSCH performs RE mapping once with eMBB UCI, then the URLLC HARQ-ACK punctures the PUSCH. The URLLC HARQ-ACK may puncture the multiplexed eMBB UCI on the PUSCH or the data on the PUSCH.

Method 1 may be beneficial when the URLLC HARQ-ACK bits are less than or equal to 2 bits. The URLLC HARQ-ACK can be reported by puncturing on eMBB UCI or data REs. Puncturing is a simple unified solution for HARQ-ACK with no more than 2 bits since the punctured REs are limited.

On the other hand, depending on UE capability, if the UE 102 can process RE rate matching based on URLLC HARQ-ACK feedback, rate matching can be used for URLLC HARQ-ACK with more than 2 bits. The rate matching may apply to PUSCH with eMBB UCI. If rate matching method is used for URLLC HARQ-ACK with more than 2 bits, the UE 102 may have to perform UCI multiplexing and rate matching twice, one for eMBB UCI, and one for URLLC HARQ-ACK.

If the both the HARK-ACK for eMBB and the HARQ-ACK for URLLC are more than 2 bits, rate matching may be performed for eMBB HARQ-ACK and CSI if present first. The URLLC HARQ-ACK rate matching may start from the same symbol or a different symbol from the eMBB HARQ-ACK. The URLLC HARQ-ACK may rate match on PUSCH including the REs that carry UCI of eMBB. Thus, the content of all symbols from the URLLC HARQ-ACK multiplexing symbol and after may be rate matched again.

If the URLLC HARQ-ACK and eMBB HARQ-ACK and/or CSI multiplexing starts from the same symbol on PUSCH, the URLLC HARQ-ACK will puncture the eMBB UCI multiplexed on PUSCH. For example, for up to 2 bits of HARQ-ACK for URLLC and up to 2 bits of HARQ-ACK for eMBB, the HARQ-ACK for eMBB is multiplexed on PUSCH with current methods by puncturing in reserved REs, and the HARQ-ACK for URLLC may also be multiplexed on PUSCH by puncturing in reserved REs following the same principle. The HARQ-ACK for URLLC may be configured with a higher beta offset value than that for HARQ-ACK of eMBB. Thus, more REs are required to multiplex the HARQ-ACK for URLLC than the HARQ-ACK for eMBB. If the same scaling factor and distribution is used for the HARQ-ACK puncturing on PUSCH, all REs for the eMBB HARQ-ACK on PUSCH is punctured by the HARQ-ACK for URLLC. If different scaling factor is configured for URLLC and eMBB, part of the REs with HARQ-ACK for eMBB are punctured by the HARQ-ACK for URLLC.

Therefore, at least when the URLLC HARQ-ACK and eMBB HARQ-ACK and/or CSI multiplexing starts from the same symbol on PUSCH, some enhancement may be needed for joint URLLC and eMBB UCI multiplexing on PUSCH.

A second method (Method 2) provides for joint consideration of URLLC and eMBB UCI multiplexing. If the URLLC HARQ-ACK and eMBB HARQ-ACK and/or CSI multiplexing starts from the same symbol on PUSCH, enhancements may be considered for joint UCI multiplexing between URLLC and eMBB. Conversely, the URLLC HARQ-ACK multiplexing on PUSCH conditions may be restricted to the case where the URLLC HARQ-ACK and eMBB HARQ-ACK and/or CSI multiplexing always start immediately after the first set of DMRS in a PUSCH. If the timing conditions cannot be satisfied, HARQ-ACK for URLLC should not be multiplexed on PUSCH, and the PUCCH carrying URLLC HARQ-ACK should be transmitted, and the PUSCH should be dropped or punctured by the PUCCH carrying URLLC HARQ-ACK.

If both HARQ-ACK of URLLC and HARQ-ACK of eMBB are present, for HARQ-ACK multiplexing, the HARQ-ACK payload may be calculated based on the total payload of URLLC HARQ-ACK and eMBB HARQ-ACK. The UCI multiplexing may be performed in the following order: HARQ-ACK is multiplexed first with further consideration of HARQ-ACK codebooks for different service types, followed by CSI part 1 and CSI part 2. For HARQ-ACK, the coded bits for URLLC HARQ-ACK are multiplexed first, followed by coded bits of eMBB HARQ-ACK.

In a special case, if URLLC HARQ-ACK has 1 bit and eMBB HARQ-ACK also has 1 bit, the total HARQ-ACK payload is 2 bits. With special handling, the HARQ-ACK can be multiplexed on PUSCH by puncturing with 2 bits of payload. The HARQ-ACK multiplexing should treat the multiplexed HARQ-ACK bits as URLLC HARQ-ACK. Thus, the number of symbols on the PUSCH for HARQ-ACK multiplexing is calculated with the beta offset value configured for URLLC HARQ-ACK. In other words, the eMBB HARQ-ACK bit is given higher protection to the same level as URLLC HARQ-ACK. Since the RE resources for up to 2 bits of HARQ-ACK are reserved assuming 2 bits of HARQ-ACK payload, the multiplexing of 1 bit of URLLC HARQ-ACK and 1 bit of eMBB HARQ-ACK does not require extra RE resources. In fact, compared with separate HARQ-ACK multiplexing for URLLC HARQ-ACK and eMBB HARQ-ACK, this method reduces the extra RE mapping for eMBB HARQ-ACK.

In another approach, for a HARQ-ACK no more than 2 bits, 2 bits is assumed for the given HARQ-ACK codebook to determine the total payload. Thus, the total payload is always more than 2 bits if both HARQ-ACK for URLLC and HARQ-ACK for eMBB are present. Therefore, a unified solution for more than 2 bits of HARQ-ACK with rate matching can be applied if HARQ-ACK for both URLLC and eMBB are present.

If the total number of HARQ-ACK bits is more than 2, for UCI multiplexing on PUSCH, the HARQ-ACK of URLLC and HARQ-ACK of eMBB may be coded separately. The coded bits for transmission on PUSCH may be calculated separately based on the different beta offset settings for URLLC HARQ-ACK and eMBB HARQ-ACK respectively. Then the UCI multiplexing may be performed in the following order: coded bits for URLLC HARQ-ACK is multiplexed first, followed coded bits for eMBB HARQ-ACK, then the coded bits for CSI part 1 and coded bits for CSI part 2 if present.

For Method 2, the equations above may be modified as follows.

The coded bits for UL-SCH may be denoted as $$g_0^{UL\text{-}SCH}, g_1^{UL\text{-}SCH}, g_3^{UL\text{-}SCH}, \ldots, g_{G^{UL\text{-}SCH}-1}^{UL\text{-}SCH}$$

The coded bits for CSI part 1, if any, may be denoted as $$g_0^{CSI\text{-}part1}, g_1^{CSI\text{-}part1}, g_2^{CSI\text{-}part1}, g_3^{CSI\text{-}part1}, \ldots, g_{G^{CSI\text{-}part1}-1}^{CSI\text{-}part1}$$

The coded bits for CSI part 2, if any, may be denoted as $$g_0^{CSI\text{-}part2}, g_1^{CSI\text{-}part2}, g_2^{CSI\text{-}part2}, g_3^{CSI\text{-}part2}, \ldots, g_{G^{CSI\text{-}part2}-1}^{CSI\text{-}part2}$$

The multiplexed data and control coded bit sequence may be denoted as $$g_0, g_1, g_2, g_3, \ldots, g_{G-1}.$$

If subslot based HARQ-ACK (e.g., HARQ-ACK codebook 1, HARQ-ACK for URLLC) is present for transmission on the PUSCH, $G^{ACK\text{-}part1}$ is the total number of coded bits for transmission of the subslot based HARQ-ACK codebook. Denote the coded bits for subslot based HARQ-ACK, if any, as $$g_0^{ACK\text{-}part1}, g_1^{ACK\text{-}part1}, g_2^{ACK\text{-}part1}, g_3^{ACK\text{-}part1}, \ldots, g_{G^{ACK\text{-}part1}-1}^{ACK\text{-}part1}.$$

If slot based HARQ-ACK (e.g., HARQ-ACK codebook 2, HARQ-ACK for eMBB) is present for transmission on the PUSCH, $G^{ACK\text{-}part2}$ is the total number of coded bits for transmission of the slot based HARQ-ACK codebook. Denote the coded bits for slot based HARQ-ACK, if any, as $$g_0^{ACK\text{-}part2}, g_1^{ACK\text{-}part2}, g_2^{ACK\text{-}part2}, g_3^{ACK\text{-}part2}, \ldots, g_{G^{ACK\text{-}part2}-1}^{ACK\text{-}part2}.$$

Thus, the total number of coded bits for transmission of HARQ-ACK is $G^{ACK} = G^{ACK\text{-}part1} + G^{ACK\text{-}part2}$. Denote the coded bits for HARQ-ACK, if any, as $g_0^{ACK}, g_1^{ACK}, g_2^{ACK}, g_3^{ACK}, \ldots g_{G^{ACK}-1}^{ACK}$, which is the concatenation of the coded HARQ-ACK bits for subslot based HARQ-ACK (HARQ-ACK part 1) and coded bits for slot based HARQ-ACK (HARQ-ACK part 2). Therefore, $$g_0^{ACK\text{-}part1}, g_1^{ACK\text{-}part1}, g_2^{ACK\text{-}part1}, \ldots, g_{G^{ACK\text{-}part1}-1}^{ACK\text{-}part1},$$

$$g_0^{ACK\text{-}part2}, g_1^{ACK\text{-}part2}, g_2^{ACK\text{-}part2}, \ldots, g_{G^{ACK\text{-}part2}-1}^{ACK\text{-}part2}$$

If frequency hopping is not configured for the PUSCH, then if subslot based HARQ-ACK is present for transmission on the PUSCH, let $G^{ACK\text{-}part1}(1) = G^{ACK\text{-}part1}$. If slot based HARQ-ACK is present for transmission on the PUSCH, let $G^{ACK\text{-}part2}(1) = G^{ACK\text{-}part2}$.

Thus, if frequency hopping is not configured for the PUSCH, and if HARQ-ACK is present for transmission on the PUSCH, let $G^{ACK}(1)$ A $G^{ACK}$ A $G^{ACK\text{-}part1} + G^{ACK\text{-}part2}$. The UCI multiplexing can then be performed following the order of HARQ-ACK, CSI-part1 and CSI-part2. Within the HARQ-ACK, subslot based HARQ-ACK is multiplexed first and slot based HARQ-ACK is multiplexed second. That is, the UCI multiplexing is performed in the following order: coded bits for URLLC HARQ-ACK is multiplexed first, followed by coded bits for eMBB HARQ-ACK, then the coded bits for CSI part 1 and coded bits for CSI part 2 if present.

If frequency hopping is configured for the PUSCH, currently, HARQ-ACK and CSI symbols are calculated separately. Half of each UCI symbols are multiplexed after the set of DMRS in each hop. However, URLLC HARQ-ACK is delay sensitive, and may not be multiplexed on the second hop. Therefore, URLLC HARQ-ACK should be multiplexed on the first hop only. Thus, the method to distribute the HARQ-ACK bits may be modified to differentiate the HARQ-ACK for URLLC and HARQ-ACK for eMBB.

First, all subslot based HARQ-ACK may be multiplexed on the first hop only. The total number of HARQ-ACK symbols can be calculated, and then distributed to two hops so that the difference between the number of UCI multiplexed symbol on two hops are minimized.

If frequency hopping is configured for the PUSCH, the total HARQ-ACK coded bits multiplexed on the first hop may be determined based on the maximum between the number of symbols for subslot based HARQ-ACK codebook and half of the total symbols for subslot based HARQ-ACK and slot based HARQ-ACK. Consequently, the remaining HARQ-ACK coded bits for slot based HARQ-ACK is multiplexed on the second hop. $G^{ACK\text{-}partX}(1)$ is the number of coded bits of HARQ-ACK bits of HARQ-ACK codebook X mapped on the first hop, and $G^{ACK\text{-}partX}(2)$ is the number of coded bits of HARQ-ACK bits of HARQ-ACK codebook X mapped on the second hop.

Thus, if the number of coded bits for URLLC HARQ-ACK is greater than or equal to the number of coded bits for eMBB HARQ-ACK, URLLC HARQ-ACK bits are multiplexed in the first hop, and eMBB HARQ-ACK is multiplexed in the second hop only.

If $G^{ACK\text{-}part1} \geq G^{ACK\text{-}part2}$, then $$G^{ACK\text{-}part1}(1) = G^{ACK\text{-}part1};$$

$$G^{ACK\text{-}part1}(2) = 0;$$

$$G^{ACK\text{-}part2}(1) = 0;$$

$$G^{ACK\text{-}part2}(2) = G^{ACK\text{-}part2}.$$

Thus, $G^{ACK}(1) = G^{ACK\text{-}part1}$ and $G^{ACK}(2) = G^{ACK\text{-}part2}$.

If the number of coded bits for URLLC HARQ-ACK is smaller than the number of coded bits for eMBB HARQ-ACK, URLLC HARQ-ACK bits and a segment of eMBB HARQ-ACK bits may be multiplexed in the first hop. The remaining HARQ-ACK bits for eMBB may be multiplexed in the second hop. Thus, for all coded HARQ-ACK bits $G^{ACK} = G^{ACK\text{-}part1} + G^{ACK\text{-}part2}$, half of the total coded HARQ-ACK bits are transmitted on the first hop, and the other half of total coded HARQ-ACK bits are in the second hop. The coded bits for URLLC HARQ-ACK and eMBB HARQ-ACK are not transmitted in the same coded symbol.

Thus, if $G^{ACK\text{-}part1} < G^{ACK\text{-}part2}$, then $$G^{ACK}(1) = N_L \cdot Q_m \cdot \lceil G^{ACK}/(2 \cdot N_L \cdot Q_m) \rceil; \text{ and}$$

$$G^{ACK}(2) = N_L \cdot Q_m \cdot \lfloor G^{ACK}/(2 \cdot N_L \cdot Q_m) \rfloor,$$

For each HARQ-ACK codebook, $$G^{ACK\text{-}part1}(1) = G^{ACK\text{-}part1};$$

$$G^{ACK\text{-}part1}(2) = 0;$$

$$G^{ACK\text{-}part2}(1) = G^{ACK}(1) - G^{ACK\text{-}part1}; \text{ and}$$

$$G^{ACK\text{-}part2}(2) = G^{ACK}(2).$$

To combine all cases into one set of equations:

$$G^{ACK}(1) = \max(G^{ACK\text{-}part1}, N_L \cdot Q_m \cdot \lceil G^{ACK}/(2 \cdot N_L \cdot Q_m) \rceil);$$

$$G^{ACK}(2) = \min(G^{ACK\text{-}part2}, N_L \cdot Q_m \cdot \lfloor G^{ACK}/(2 \cdot N_L \cdot Q_m) \rfloor) = G^{ACK} - G^{ACK}(1);$$

$$G^{ACK\text{-}part1}(1) = G^{ACK\text{-}part1} \text{ and } G^{ACK\text{-}part1}(2) = 0;$$

$$G^{ACK\text{-}part2}(1) = G^{ACK}(1) - G^{ACK\text{-}part1} \text{ and } G^{ACK\text{-}part2}(2) = G^{ACK}(2)$$

Within each hop, the UCI multiplexing can then be performed following the order of HARQ-ACK, CSI-part1 and CSI-part2. In the first hop, all coded bits of subslot based HARQ-ACK are multiplexed first, followed by a segment of coded bits for eMBB HARQ-ACK if $G^{ACK\text{-}part1} < G^{ACK\text{-}part2}$, then the coded bits for CSI part 1 and coded bits for CSI part 2 if present. In the second hop, remaining coded bits of slot based HARQ-ACK are multiplexed first, followed by the coded bits for CSI part 1 and coded bits for CSI part 2 if present.

The above methods to determine $G^{ACK}$, $G^{ACK}(1)$ and $G^{ACK}(2)$ are valid for all HARQ-ACK codebooks. If only eMBB HARQ-ACK is present, the equations lead to the same results as in the current specification. If both HARQ-ACK and CSI are present for transmission on the PUSCH, similar modifications are needed to adjust the number of HARQ-ACK bits and CSI bits on each hop. The URLLC HARQ-ACK should be always multiplexed in the first hop only. Thus, the following updates are may be used if both URLLC HARQ-ACK and eMBB HARQ-ACK are to be multiplexed on the same PUSCH.

For Method 2, the following modifications may be applied. If frequency hopping is configured for the PUSCH,
- denote $l^{(1)}$ as the OFDM symbol index of the first OFDM symbol after the first set of consecutive OFDM symbol(s) carrying DMRS in the first hop;
- denote $l^{(2)}$ as the OFDM symbol index of the first OFDM symbol after the first set of consecutive OFDM symbol(s) carrying DMRS in the second hop.
- denote $l_{CSI}^{(1)}$ as the OFDM symbol index of the first OFDM symbol that does not carry DMRS in the first hop;
- denote $l_{CSI}^{(2)}$ as the OFDM symbol index of the first OFDM symbol that does not carry DMRS in the second hop.

If HARQ-ACK is present for transmission on the PUSCH with UL-SCH, let $G^{ACK}(1) = \max(G^{ACK-part1}, N_L \cdot \lceil Q_m \cdot G^{ACK}/(2 \cdot N_L \cdot Q) \rceil)$, and $G^{ACK}(2) G^{ACK} - G^{ACK}$ If CSI is present for transmission on the PUSCH with UL-SCH, let $G^{CSI-part1}(1) = N_L \cdot Q_m \cdot \lceil G^{CSI-part1}/2 \cdot N_L \cdot Q_m \rceil$;

$G^{CSI-part1}(2) N_L \cdot Q_m \cdot \lceil G^{CSI-part1}/(2 \cdot N_L \cdot Q_m) \rceil$;

$G^{CSI-part2}(1) = N_L \cdot Q_m \cdot \lceil G^{CSI-part2}/(2 \cdot N_L \cdot Q_m) \rceil$; and $G^{CSI-part2}(2) = N_L \cdot Q_m \cdot \lceil G^{CSI-part2}/2 N_L \cdot Q_m \rceil$.

If only HARQ-ACK and CSI part 1 are present for transmission on the PUSCH without UL-SCH, let $$G^{ACK}(1) = \min\left(\begin{array}{l}\max(G^{ACK-part1}, N_L \cdot \lfloor Q_m \cdot G^{ACK}/(2 \cdot N_L \cdot Q_m)\rfloor), \\ M_3 \cdot N_L \cdot Q_m\end{array}\right);$$

$G^{ACK(2)} = G^{ACK} - G^{ACK}(1)$;

$G^{CSI-part1}(1) = M_1 \cdot N_L \cdot Q_m - G^{ACK}(1)$; and $G^{CSI-part1}(2) = G^{CSI-part1} - G^{CSI-part1}(1)$.

If HARQ-ACK, CSI part 1 and CSI part 2 are present for transmission on the PUSCH without UL-SCH, let $$G^{ACK}(1) = \min\left(\begin{array}{l}\max(G^{ACK-part1}, N_L \cdot Q_m \cdot \lfloor G^{ACK}/(2 \cdot N_L \cdot Q_m)\rfloor), \\ M_3 \cdot N_L \cdot Q_m\end{array}\right);$$

and $G^{CSI-part1}(2) = G^{ACK} - G^{ACK}(1)$.

If the number of HARQ-ACK information bits is more than 2, $$G^{CSI-part1}(1) = \min\left(\begin{array}{l}N_L \cdot Q_m \cdot \lfloor G^{CSI-part1}/(2 \cdot N_L \cdot Q_m)\rfloor, \\ M_1 \cdot N_L \cdot Q_m - G^{ACK}(1)\end{array}\right);$$

otherwise, $$G^{CSI-part1}(1) = \min\left(\begin{array}{l}N_L \cdot Q_m \cdot \lfloor G^{CSI-part1}/(2 \cdot N_L \cdot Q_m)\rfloor, \\ M_1 \cdot N_L \cdot Q_m - G^{ACK}_{rvd}(1)\end{array}\right);$$

$G^{CSI-part1}(2) = G^{CSI-part1} - G^{CSI-part1}(1)$;

$G^{CSI-part2}(1) = M_1 \cdot N_L \cdot Q_m - G^{CSI-part1}(1)$ if the number of HARQ-ACK information bits is no more than 2, and $G^{CSI-part2}(1) = M_2 \cdot N_L \cdot Q_m - G^{ACK}(1) - G^{CSI-part1}(1)$ otherwise; and $G^{CSI-part2}(2) = M_2 \cdot N_L \cdot Q_m - G^{CSI-part1}(2)$ if the number of HARQ-ACK information bits is no more than 2, and $G^{CSI-part2}(2) = M_2 \cdot N_L \cdot Q_m - G^{ACK}(2) - G^{CSI-part1}(2)$ otherwise.

If CSI part 1 and CSI part 2 are present for transmission on the PUSCH without UL-SCH, let $$G^{CSI-part1}(1) = \min\left(\begin{array}{l}N_L \cdot Q_m \cdot \lfloor G^{CSI-part1}/(2 \cdot N_L \cdot Q_m)\rfloor, \\ M_1 \cdot N_L \cdot Q_m - G^{ACK}_{rvd}(1)\end{array}\right);$$

$G^{CSI-part1}(2) = G^{SCI-part1} - G^{CSI-part1}(1)$;

$G^{CSI-part2}(1) = M_l \cdot N_L \cdot Q_m - G^{CSI-part1}(1)$; and $G^{CSI-part2}(2) = M_2 \cdot N_L \cdot Q_m - G^{CSI-part1}(2)$.

Let $N_{hop}^{PUSCH} = 2$ and denote $N_{symb,hop}^{PUSCH}(1)$, $N_{symb,hop}^{PUSCH}(2)$ as the number of OFDM symbols of the PUSCH in the first and second hop, respectively.

$N_L$ is the number of transmission layers of the PUSCH.
$Q_m$ is the modulation order of the PUSCH.

$$M_1 = \sum_{l=0}^{N_{symb,hop}^{PUSCH}(1)-1} M_{SC}^{USCI}(l);$$

$$M_2 = \sum_{l=N_{symb,hop}^{PUSCH}(1)}^{N_{symb,hop}^{PUSCH}(1)+N_{symb,hop}^{PUSCH}(2)-1} M_{SC}^{USCI}(l);$$

$$M_3 = \sum_{l=l^{(1)}}^{N_{symb,hop}^{PUSCH}(1)-1} M_{SC}^{USCI}(l).$$

If frequency hopping is not configured for the PUSCH, denote $N_{hop}^{PUSCH} = 1$ as the OFDM symbol index of the first OFDM symbol after the first set of consecutive OFDM symbol(s) carrying DMRS;
denote $l_{CSI}^{(1)}$ as the OFDM symbol index of the first OFDM symbol that does not carry DMRS;
if HARQ-ACK is present for transmission on the PUSCH, let $G^{ACK}(1) = G^{ACK}$;

if CSI is present for transmission on the PUSCH, let $G^{CSI\text{-}part1}(1)=G^{CSI\text{-}part1}$ and $G^{CSI\text{-}part2}(1)=G^{CSI\text{-}part2}$; and let $N_{hop}^{PUSCH}=1$ and $N_{symb,hop}^{PUSCH}(1)=N_{symb,all}^{PUSCH}$ In a case that the frequency hopping is configured and DCI of DL assignment (e.g., a DCI format for DL scheduling) scrambled by a RNTI (e.g., MCS RNTI or a RNTI different from MCS RNTI) for URLLC is received, the PUSCH REs in the second hop may be used to map the HARQ-ACK codebook 1 and/or HARQ-ACK codebook 2. Alternately or additionally, in a case that the frequency hopping is configured, and DCI of DL assignment indicates the subslot based HARQ-ACK feedback, the PUSCH REs in the second hop can be used to map the HARQ-ACK codebook 1 and/or HARQ-ACK codebook 2. Alternately or additionally, in a case that subslot based HARQ-ACK feedback is configured by higher layer (e.g., RRC), the PUSCH REs in the second hop can be used to map the HARQ-ACK codebook 1 and/or HARQ-ACK codebook 2.

If the URLLC HARQ-ACK multiplexing in the second hop of the PUSCH is known before the PUSCH transmission, the UCI for eMBB and HARQ-ACK for URLLC can also be jointly considered. All URLLC HARQ-ACK should be multiplexed in the second hop only. The HARQ-ACK for eMBB may be divided into two parts, the first part is multiplexed immediately after the DMRS of the first hop; the second part if present, is multiplexed after the URLLC HARQ-ACK in the second hop.

Thus, if the number of coded bits for URLLC HARQ-ACK is greater than or equal to the number of coded bits for eMBB HARQ-ACK, URLLC HARQ-ACK bit are multiplexed in the second hop only, and eMBB HARQ-ACK is multiplexed in the first hop only.

If $G^{ACK\text{-}part1} \geq G^{ACK\text{-}part2}$, then $G^{ACK\text{-}part1}(1)=0$;

$G^{ACK\text{-}part1}(2)=G^{ACK\text{-}part1}$;

a $G^{ACK\text{-}part2}(1)=G^{ACK\text{-}part2}$; and $G^{ACK\text{-}part2}(2)=0$.

Thus, $G^{ACK}(1)=G^{ACK\text{-}part2}$ and $G^{ACK}(2)=G^{ACK\text{-}part1}$

If the number of coded bits for URLLC HARQ-ACK is less than the number of coded bits for eMBB HARQ-ACK, a segment of eMBB HARQ-ACK may be multiplexed in the first hop, URLLC HARQ-ACK bits and the remaining segment of eMBB HARQ-ACK bits may be multiplexed in the second hop. Thus, for all coded HARQ-ACK bits $G^{ACK}=G^{ACK\text{-}part1}+G^{ACK\text{-}part2}$, half of the total coded HARQ-ACK bits are transmitted on the first hop, and the other half of total coded HARQ-ACK bits are transmitted in the second hop. The coded bits for URLLC HARQ-ACK and eMBB HARQ-ACK are not transmitted in the same coded symbol.

Thus, if $G^{ACK\text{-}part1} < G^{ACK\text{-}part2}$ then $G^{ACK}(1)N_L \cdot Q_m \cdot \lceil G^{ACK}/(2 \cdot N_L \cdot Q_m)\rceil$; and $G^{ACK}(2)=N_L \cdot Q_m \cdot \lceil G^{ACK}/(2 \cdot N_L \cdot Q_m)\rceil$.

For each HARQ-ACK codebook, $G^{ACK\text{-}part1}(1)=0$;

$G^{ACK\text{-}part1}(2)=G^{ACK\text{-}part1}$;

$G^{ACK\text{-}part2}(1)=G^{ACK}(1)$; and $G^{ACK\text{-}part2}(2)G^{ACK}(2)-G^{ACK\text{-}part1}$.

Thus, the total number of coded bits for transmission of HARQ-ACK is $G^{ACK}=G^{ACK\text{-}part1}+G^{ACK\text{-}part2}$. The coded bits for HARQ-ACK, if any, may be denoted as $g_0^{ACK}, g_1^{ACK}, g_2^{ACK}, g_3^{ACK}, \ldots, g_G^{ACK\text{-}ACK-1}$, which is formed by inserting the coded HARQ-ACK bits for subslot based HARQ-ACK (HARQ-ACK part 1) into coded bits for slot based HARQ-ACK (HARQ-ACK part 2) based on the HARQ-ACK segmentation in each hop. Therefore, $g_0^{ACK\text{-}part2}, g_1^{ACK\text{-}part2}, \ldots, g_{G^{ACK(1)}-1}^{ACK\text{-}part2}$.

$g_0^{ACK\text{-}part1}, g_1^{ACK\text{-}part1}, \ldots, g_{G_A^{CK\text{-}part1}-1}^{ACK\text{-}part1}$.

$g_{G^{ACK}(1)}^{ACK\text{-}part2}, g_{G^{ACK}(1)+1}^{ACK\text{-}part2}, \ldots, g_{G^{ACK\text{-}part2}-1}^{ACK\text{-}part2}$.

If frequency hopping is configured for the PUSCH, and if the URLLC HARQ-ACK multiplexing is performed only in the second hop of the PUSCH, and is known before the PUSCH transmission, all cases can be combined into one set of equations:

$G^{ACK}(1)=\min(G^{ACK\text{-}part2}, N_L \cdot Q_m \cdot \lceil G^{ACK}/(2 \cdot N_L \cdot Q_m)\rceil)$
and $G^{ACK}(2)=\max(G^{ACK\text{-}part1} N_L \cdot Q_m \cdot \lceil G^{ACK}/(2 \cdot N_L \cdot Q_m)\rceil)=G^{ACK}=G^{ACK}(1)$;

$G^{ACK\text{-}part1}(1)=0$ and $G^{ACK\text{-}part1}(2)=G^{ACK\text{-}part1}$; and $G^{ACK\text{-}part2}(1)=G^{ACK}(1)$ and $G^{ACK\text{-}part2}(2)=G^{ACK}(2)-G^{ACK\text{-}part1}$.

Within each hop, the UCI multiplexing may then be performed following the order of HARQ-ACK, CSI-part1 and CSI-part2. In the first hop, a segment of slot based HARQ-ACK is multiplexed first, followed by the coded bits for CSI part 1 and coded bits for CSI part 2 if present. In the second hop, all coded bits of subslot based HARQ-ACK is multiplexed first, followed by the remaining segment of coded bits for eMBB HARQ-ACK if $G^{ACK\text{-}part1} < G^{ACK\text{-}part2}$, then the coded bits for CSI part 1 and coded bits for CSI part 2 if present.

If frequency hopping is configured for the PUSCH, and if the URLLC HARQ-ACK multiplexing is performed only in the second hop of the PUSCH, and is known before the PUSCH transmission, then if HARQ-ACK is present for transmission on the PUSCH with UL-SCH, let $G^{ACK}(1)=\min(G^{ACK\text{-}part2} N_L \cdot Q_m \cdot \lceil G^{ACK}/(2 \cdot N_L \cdot Q_m)\rceil)$
and $G^{ACK}(2)=\max(G^{ACK\text{-}part1}, N_L \cdot Q_m \cdot \lceil G^{ACK}/(2 \cdot N_L \cdot Q_m)\rceil)$.

If only HARQ-ACK and CSI part 1 are present for transmission on the PUSCH without UL-SCH, let $$G^{ACK}(2) = \min\left(\begin{array}{c}\max(G^{ACK-part1}, N_L \cdot Q_m \cdot \lceil G^{ACK}/(2 \cdot N_L \cdot Q_m)\rceil), \\ M_3 \cdot N_L \cdot Q_m\end{array}\right)$$

$G^{ACK}(1)=G^{ACK}-G^{ACK}(2)$;

$G^{CSI\text{-}part1}(1)=M_1 \cdot N_L \cdot Q_m - G^{ACK}(1)$; and $G^{CSI\text{-}part1}(2)=G^{CSI\text{-}part1}-G^{CSI\text{-}part1}(1)$.

If HARQ-ACK, CSI part 1 and CSI part 2 are present for transmission on the PUSCH without UL-SCH, let $$G^{ACK}(2) = \min\left(\begin{array}{c}\max(G^{ACK-part1}, N_L \cdot Q_m \cdot \lceil G^{ACK}/(2 \cdot N_L \cdot Q_m)\rceil), \\ M_3 \cdot N_L \cdot Q_m\end{array}\right);$$

$$G^{ACK}(1) = G^{ACK} - G^{ACK}(2).$$

On the other hand, if the URLLC HARQ-ACK multiplexing in the second hop of the PUSCH is not known before the PUSCH transmission, the UCI for eMBB and HARQ-ACK for URLLC cannot be jointly considered. Thus, the eMBB UCI should be multiplexed first. The URLLC HARQ-ACK can then be multiplexed on the second hop of the PUSCH following the HARQ-ACK for URLLC only case. For example, URLLC HARQ-ACK may be multiplexed by puncturing the PUSCH if the number of HARQ-ACK for URLLC is no more than 2 bits, and by rate matching or puncturing the PUSCH in the second hop if the number of HARQ-ACK for URLLC is more than 2 bits.

In the case of puncturing, the eMBB UCI multiplexed on PUSCH may be punctured by the URLLC HARQ-ACK. In the case of rate matching, the eMBB UCI multiplexed on PUSCH may move down to later REs by the rate matched URLLC HARQ-ACK.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH configuration and resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
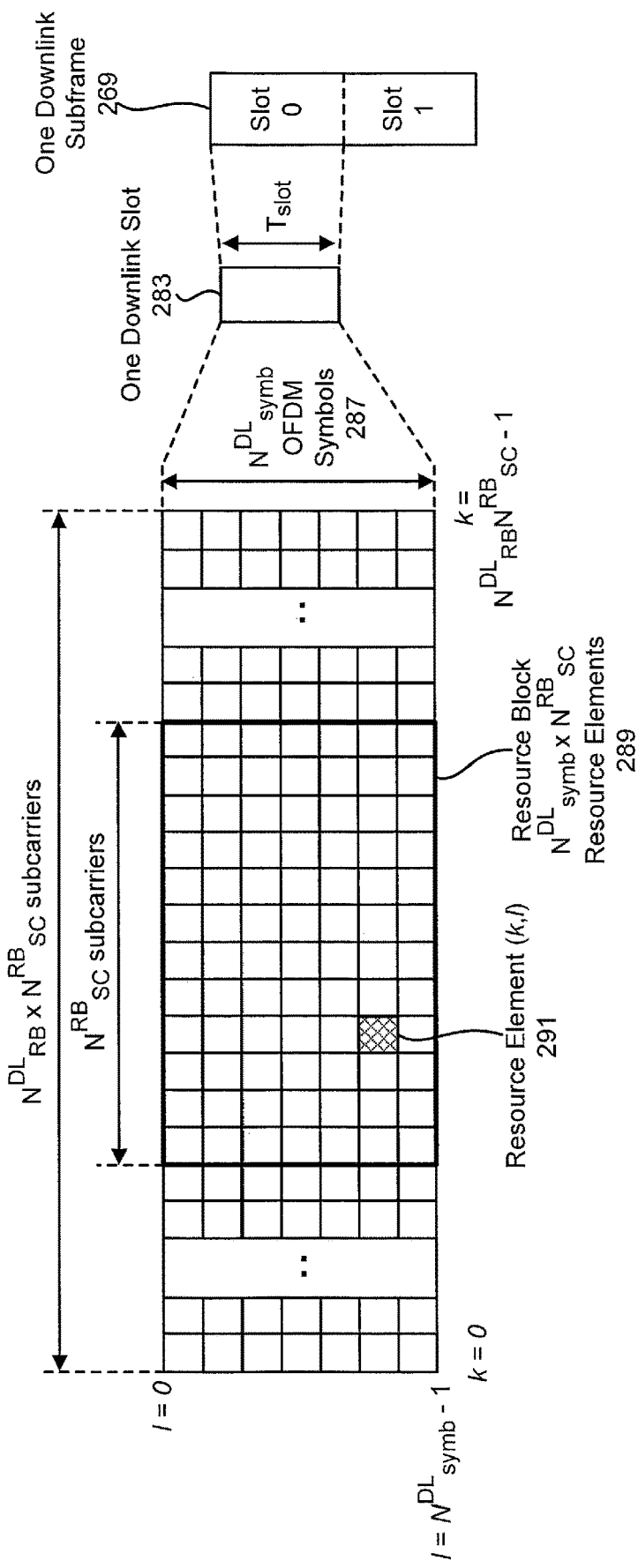
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l > l_{data,start}$ and/or $l_{data,end} > l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
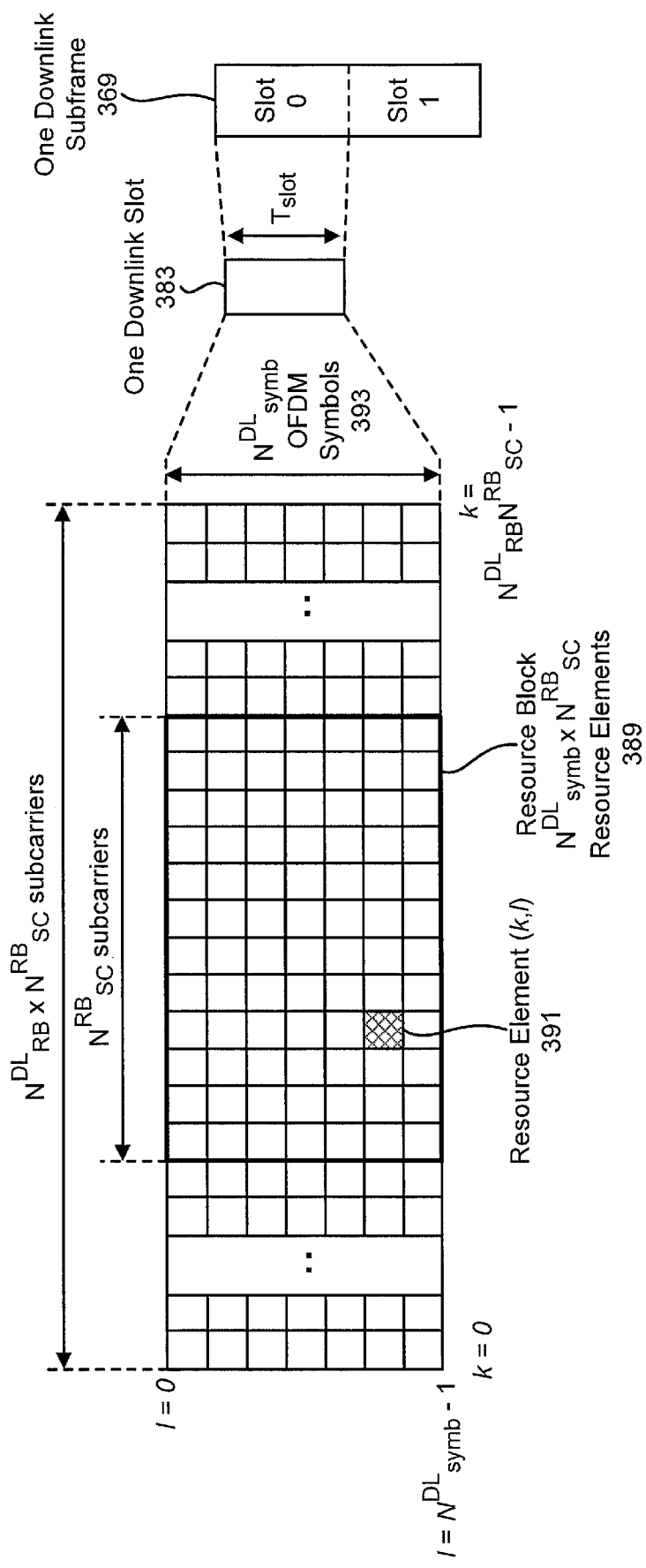
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
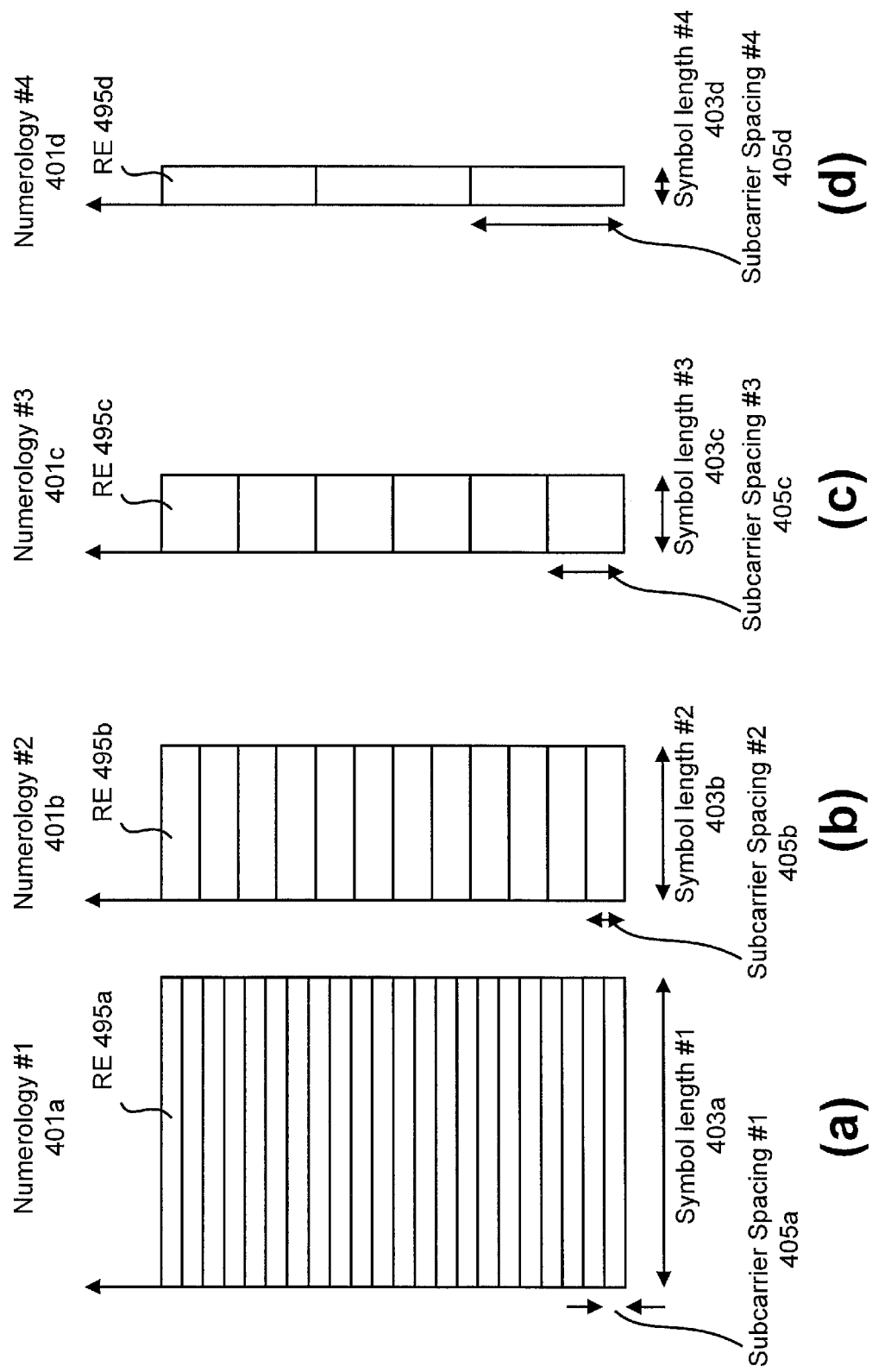
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the ith numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
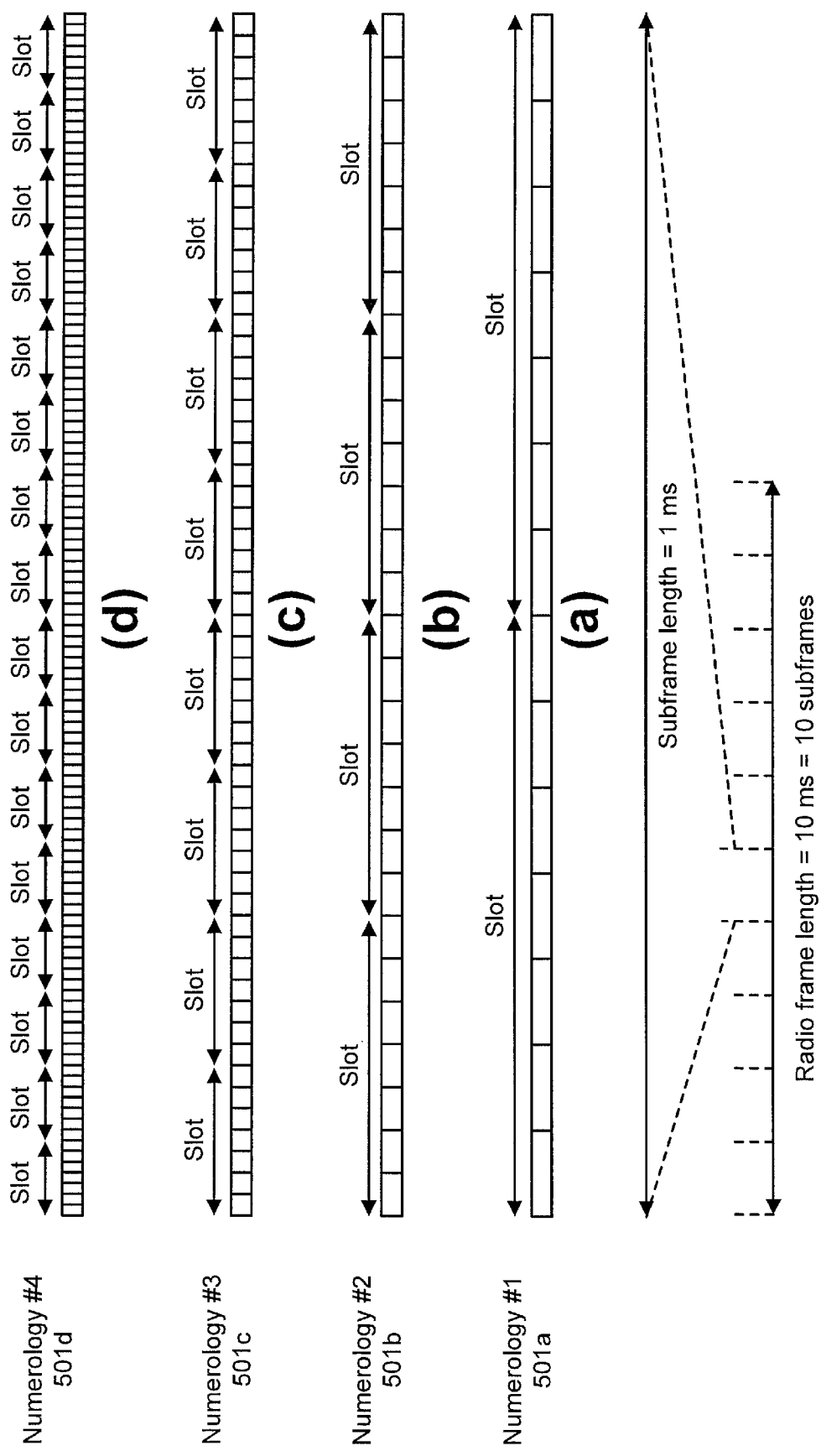
FIG. 5 shows examples of subframe structures for the numerologies that are shown in FIG. 4.

FIG. 5 shows examples of subframe structures for the numerologies 501 that are shown in FIG. 4. Given that a slot 583 includes $N^{DL}_{symb}$ (or $N^{UL}_{symb}$)=7 symbols, the slot length of the i+1-th numerology 501 is a half of the one for the i-th numerology 501, and eventually the number of slots 583 in a subframe (i.e., 1 ms) becomes double. It may be noted that a radio frame may include 10 subframes, and the radio frame length may be equal to 10 ms.

Figure 6:
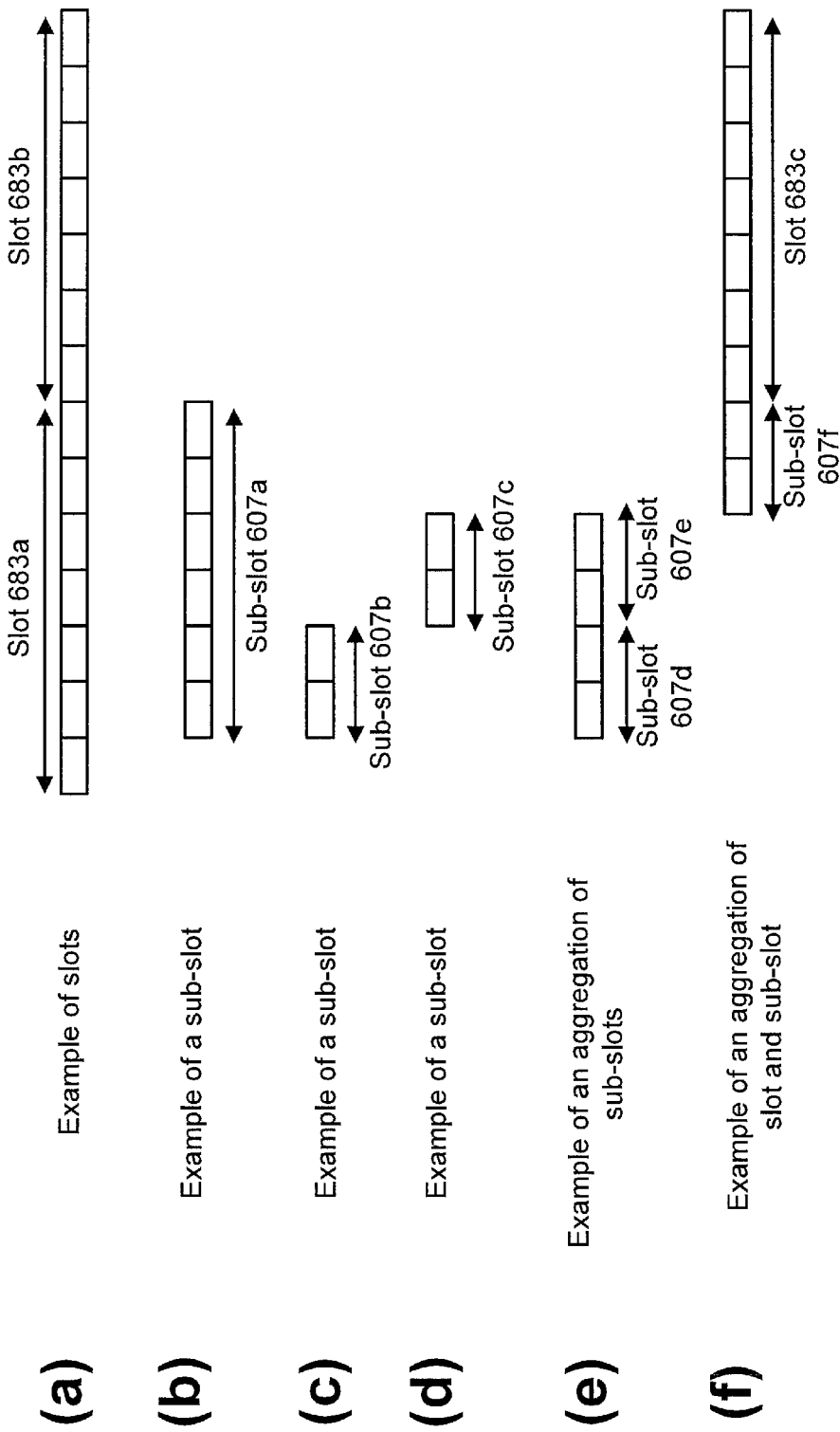
FIG. 6 shows examples of slots and subslots.

FIG. 6 shows examples of slots 683 and subslots 607. If a subslot 607 is not configured by higher layer, the UE 102 and the eNB/gNB 160 may only use a slot 683 as a scheduling unit. More specifically, a given transport block may be allocated to a slot 683. If the subslot 607 is configured by higher layer, the UE 102 and the eNB/gNB 160 may use the subslot 607 as well as the slot 683. The subslot 607 may include one or more OFDM symbols. The maximum number of OFDM symbols that constitute the subslot 607 may be $N^{DL}_{symb}-1$ (or $N^{UL}_{symb}-1$).

The subslot length may be configured by higher layer signaling. Alternatively, the subslot length may be indicated by a physical layer control channel (e.g., by DCI format).

The subslot 607 may start at any symbol within a slot 683 unless it collides with a control channel. There could be restrictions of mini-slot length based on restrictions on starting position. For example, the subslot 607 with the length of $N^{DL}_{symb}-1$ (or $N^{UL}_{symb}-1$) may start at the second symbol in a slot 683. The starting position of a subslot 607 may be indicated by a physical layer control channel (e.g., by DCI format). Alternatively, the starting position of a subslot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned subslot 607.

In cases when the subslot 607 is configured, a given transport block may be allocated to either a slot 683, a subslot 607, aggregated subslots 607 or aggregated subslot(s) 607 and slot 683. This unit may also be a unit for HARQ-ACK bit generation.

Figure 7:
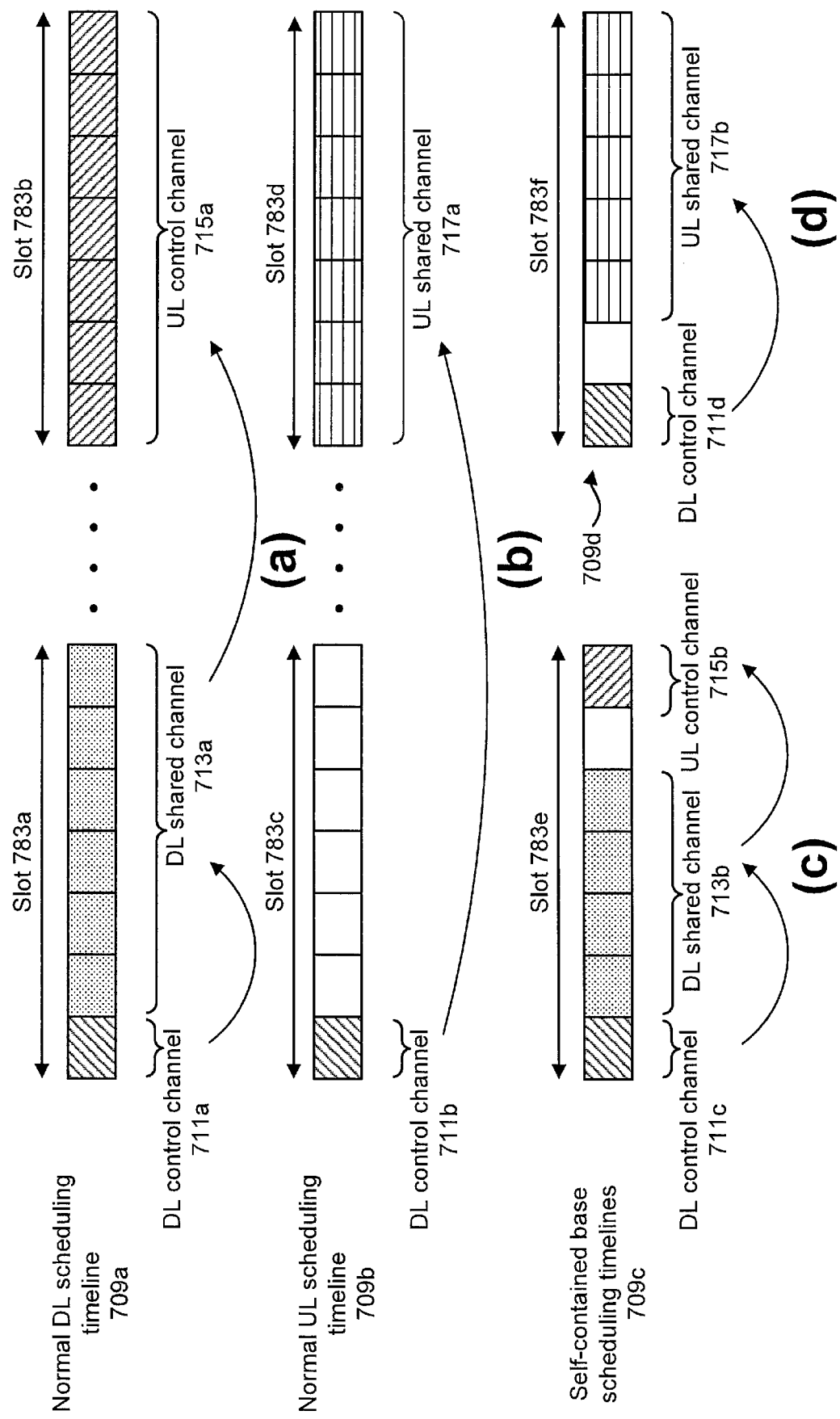
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the subslot. Yet alternatively, the use of a self-contained slot may be upon a configuration of shortened physical channel (e.g., PDSCH, PUSCH, PUCCH, etc.).

Figure 8:
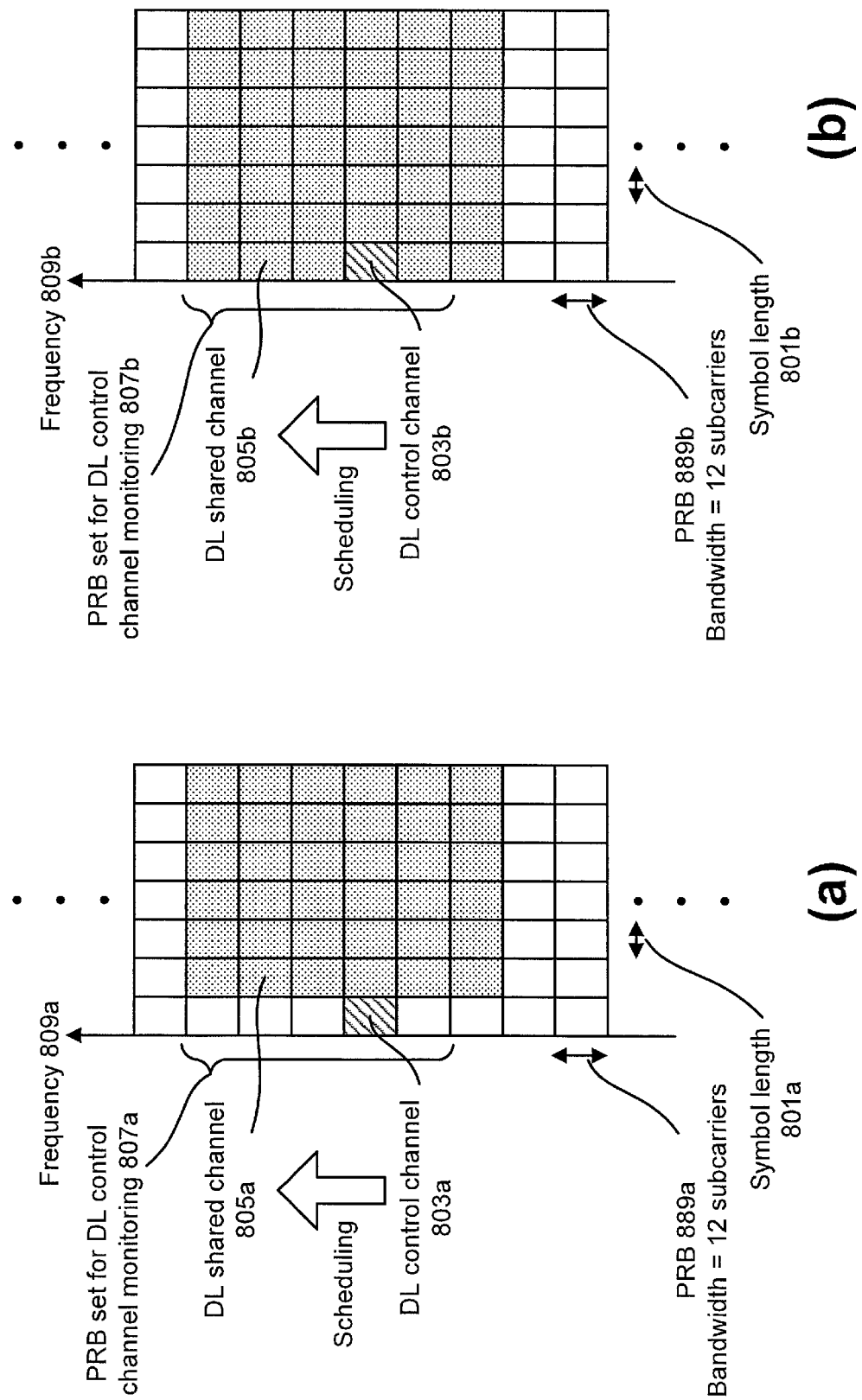
FIG. 8 shows examples of DL control channel monitoring regions.

FIG. 8 shows examples of DL control channel monitoring regions. In a first example (a), a physical resource block (PRB) 889a is shown with a symbol length 801a and frequency 809a. In a second example (a), a physical resource block (PRB) 889b is shown with a symbol length 801b and frequency 809b. In an implementation, the bandwidth of the PRB 889a,b.

In the examples of FIG. 8, one or more sets of PRB(s) 889 may be configured for DL control channel monitoring. In other words, a control resource set 807a,b is, in the frequency domain, a set of PRBs 889a,b within which the UE 102 attempts to blindly decode downlink control information, where the PRBs 889a,b may or may not be frequency contiguous. A UE 102 may have one or more control resource sets 807a,b, and one DCI message may be located within one control resource set 807a,b. In the frequency-domain, a PRB 889 is the resource unit size (which may or may not include Demodulation reference signals (DMRS)) for a control channel 803a,b. A DL shared channel 805a,b may start at a later OFDM symbol than the one(s) which carries the detected DL control channel 803a,b. Alternatively, the DL shared channel 805a,b may start at (or earlier than) an OFDM symbol than the last OFDM symbol which carries the detected DL control channel 803a,b. In other words, dynamic reuse of at least part of resources in the control resource sets 807a,b for data for the same or a different UE 102, at least in the frequency domain may be supported.

Figure 9:
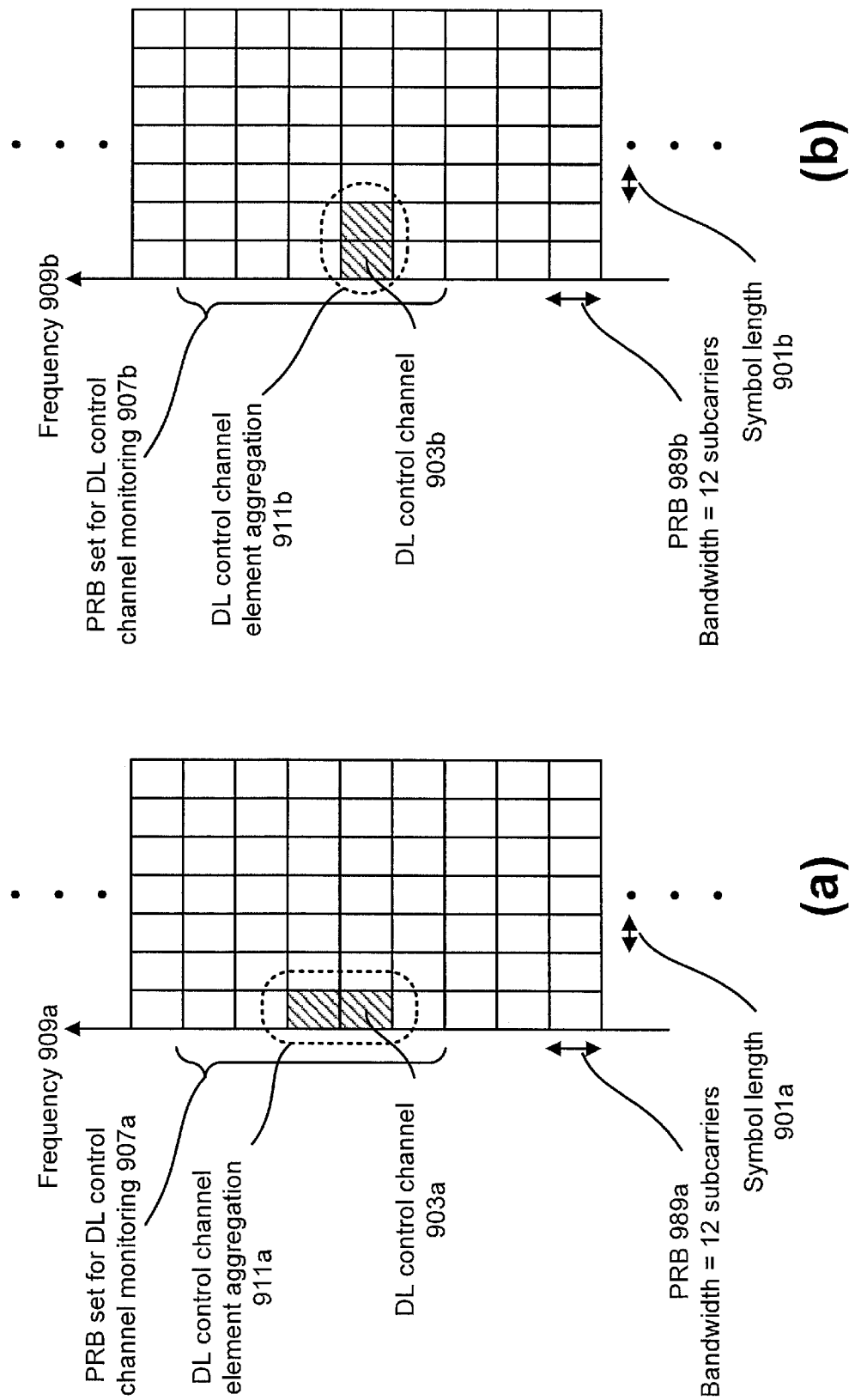
FIG. 9 shows examples of DL control channel which includes more than one control channel elements.

FIG. 9 shows examples of a DL control channel 903a,b which includes more than one control channel elements. In a first example (a), a physical resource block (PRB) 989a is shown with a symbol length 901a and frequency 909a. In a second example (a), a physical resource block (PRB) 989b is shown with a symbol length 901b and frequency 909b.

When the control resource set 907a,b spans multiple OFDM symbols, a control channel candidate may be mapped to multiple OFDM symbols or may be mapped to a single OFDM symbol. One DL control channel element 903a,b may be mapped on REs defined by a single PRB 989a,b and a single OFDM symbol. If more than one DL control channel elements 903a,b are used for a single DL control channel transmission, DL control channel element aggregation 911a,b may be performed.

The number of aggregated DL control channel elements 903a,b is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set 907a,b. If one DL control channel 903a,b is mapped to a single OFDM symbol and does not span multiple OFDM symbols, the DL control channel element aggregation is performed within an OFDM symbol, namely multiple DL control channel elements 903a,b within an OFDM symbol are aggregated. Otherwise, DL control channel elements 903a,b in different OFDM symbols can be aggregated.

Figure 10:
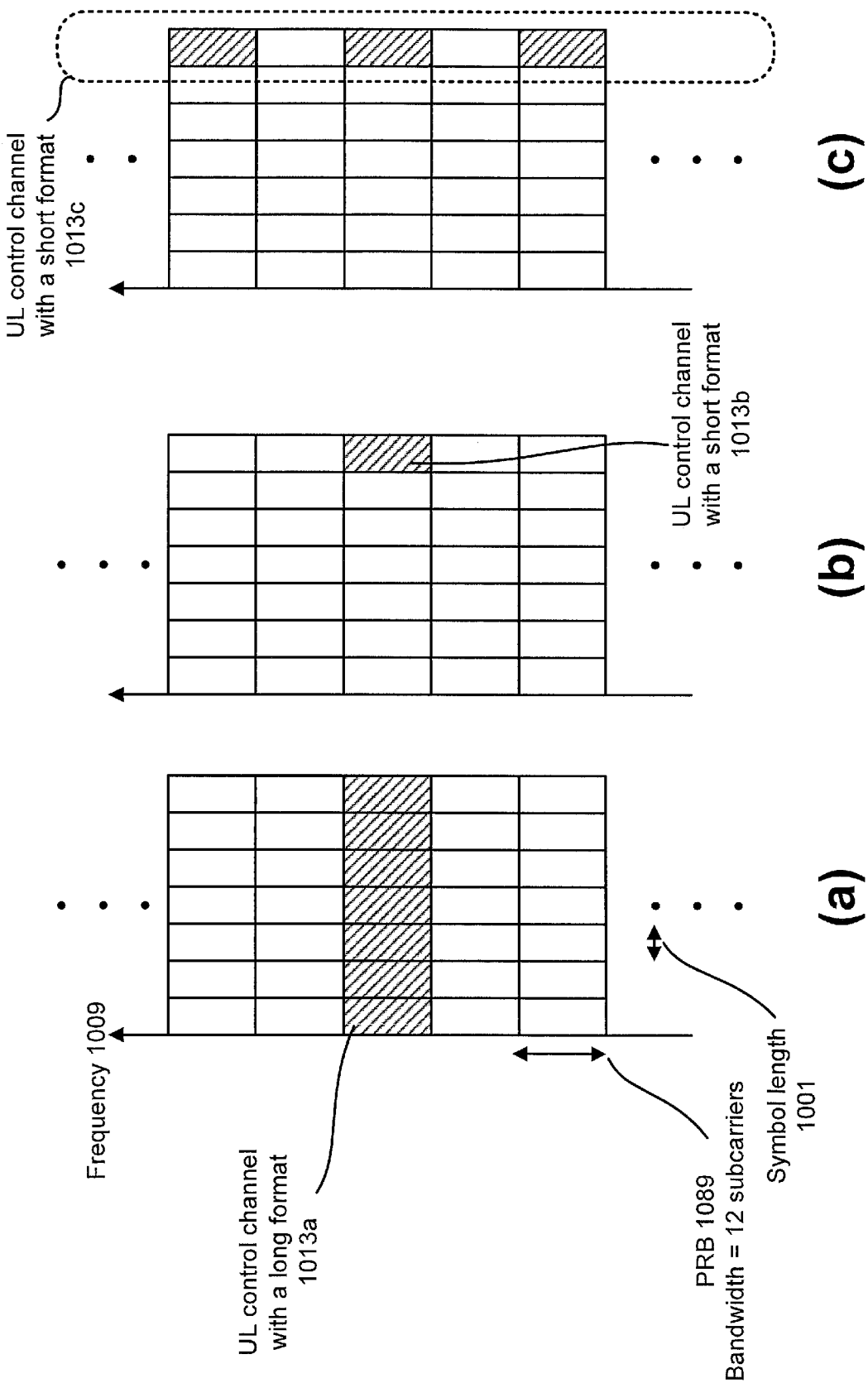
FIG. 10 shows examples of UL control channel structures.

FIG. 10 shows examples of UL control channel structures. In the examples of FIG. 10, physical resource blocks (PRBs) 1089 are shown with a symbol length 1001 and frequency 1009.

In a first example (a), the UL control channel 1013a may be mapped on REs which are defined by a PRB 1089 and a slot in frequency and time domains, respectively. This UL control channel 1013a may be referred to as a long format (or just the 1st format).

In the second example (b) and third example (c), UL control channels 1013b,c may be mapped on REs on a limited OFDM symbols in time domain. This may be referred to as a short format (or just the 2nd format). The UL control channels 1013b,c with a short format may be mapped on REs within a single PRB 1089. Alternatively, the UL control channels 1013b,c with a short format may be mapped on REs within multiple PRBs 1089. For example, interlaced mapping may be applied, namely the UL control channel 1013b,c may be mapped to every N PRBs (e.g., 5 or 10) within a system bandwidth.

Figure 11:
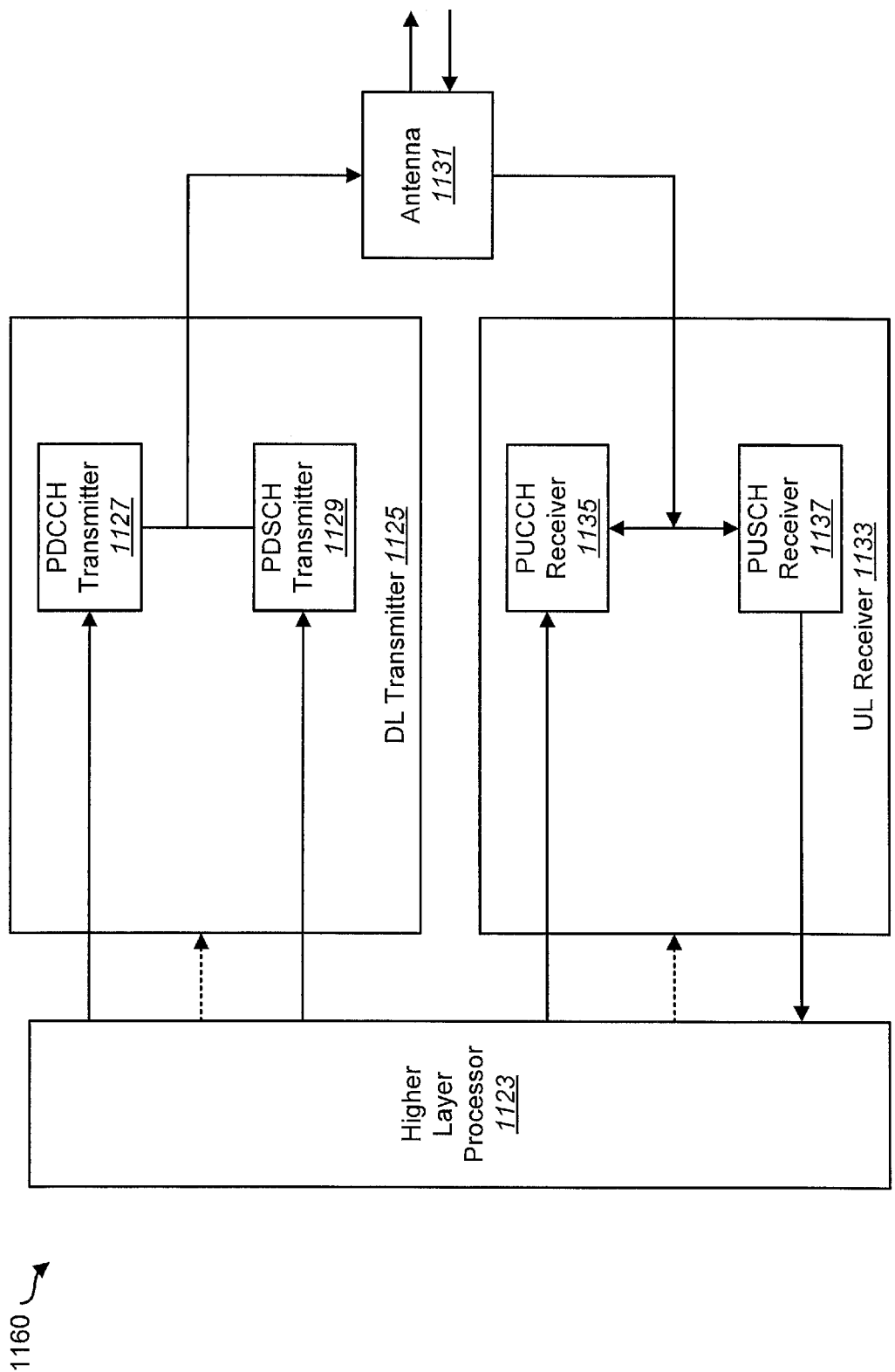
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
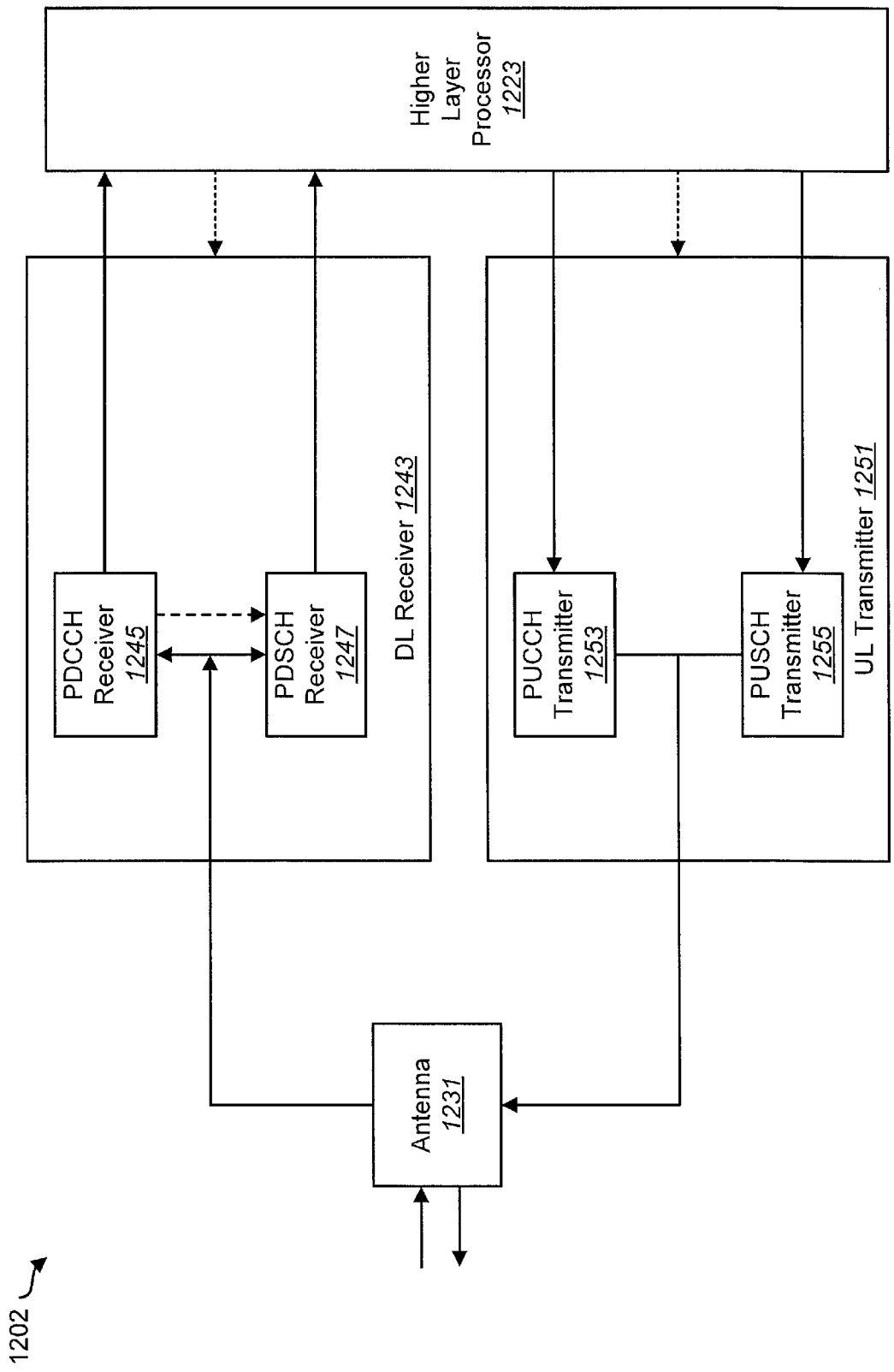
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
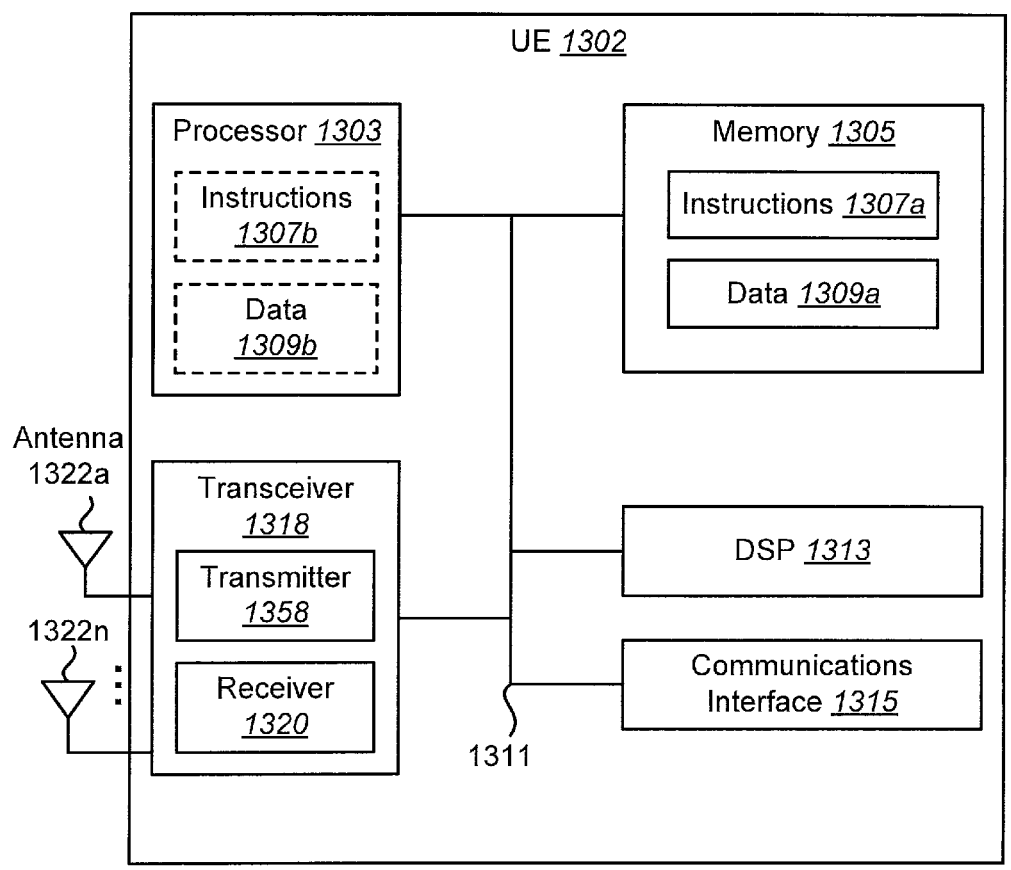
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described herein.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
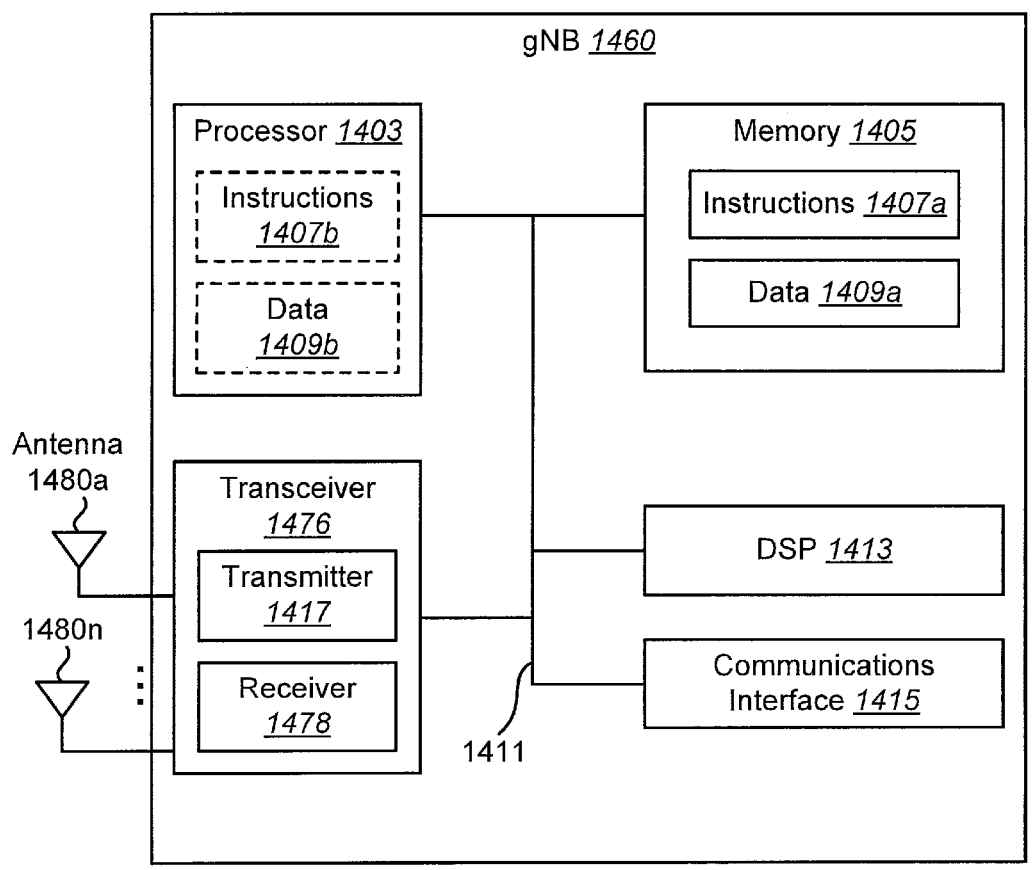
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described herein.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
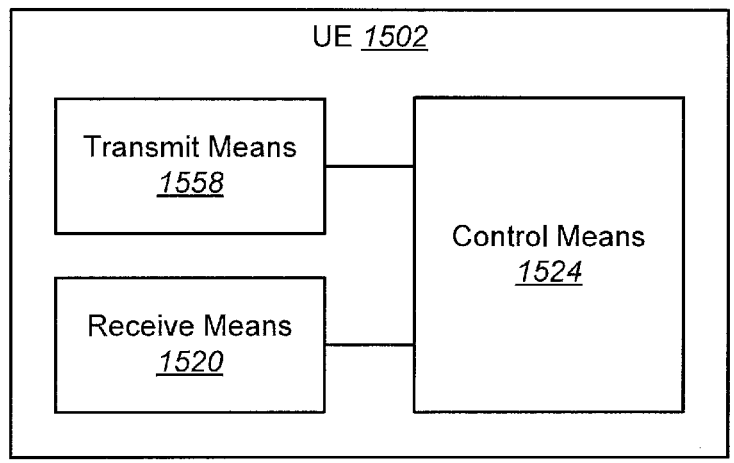
FIG. 15 is a block diagram illustrating one implementation of a UE in which the systems and methods described herein may be implemented.

FIG. 15 is a block diagram illustrating one implementation of a UE 1502 in which the systems and methods described herein may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
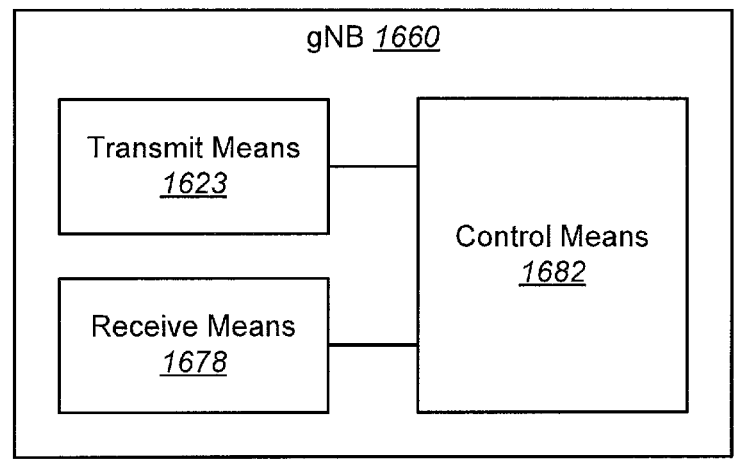
FIG. 16 is a block diagram illustrating one implementation of a gNB in which the systems and methods described herein may be implemented.

FIG. 16 is a block diagram illustrating one implementation of a gNB 1660 in which the systems and methods described herein may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
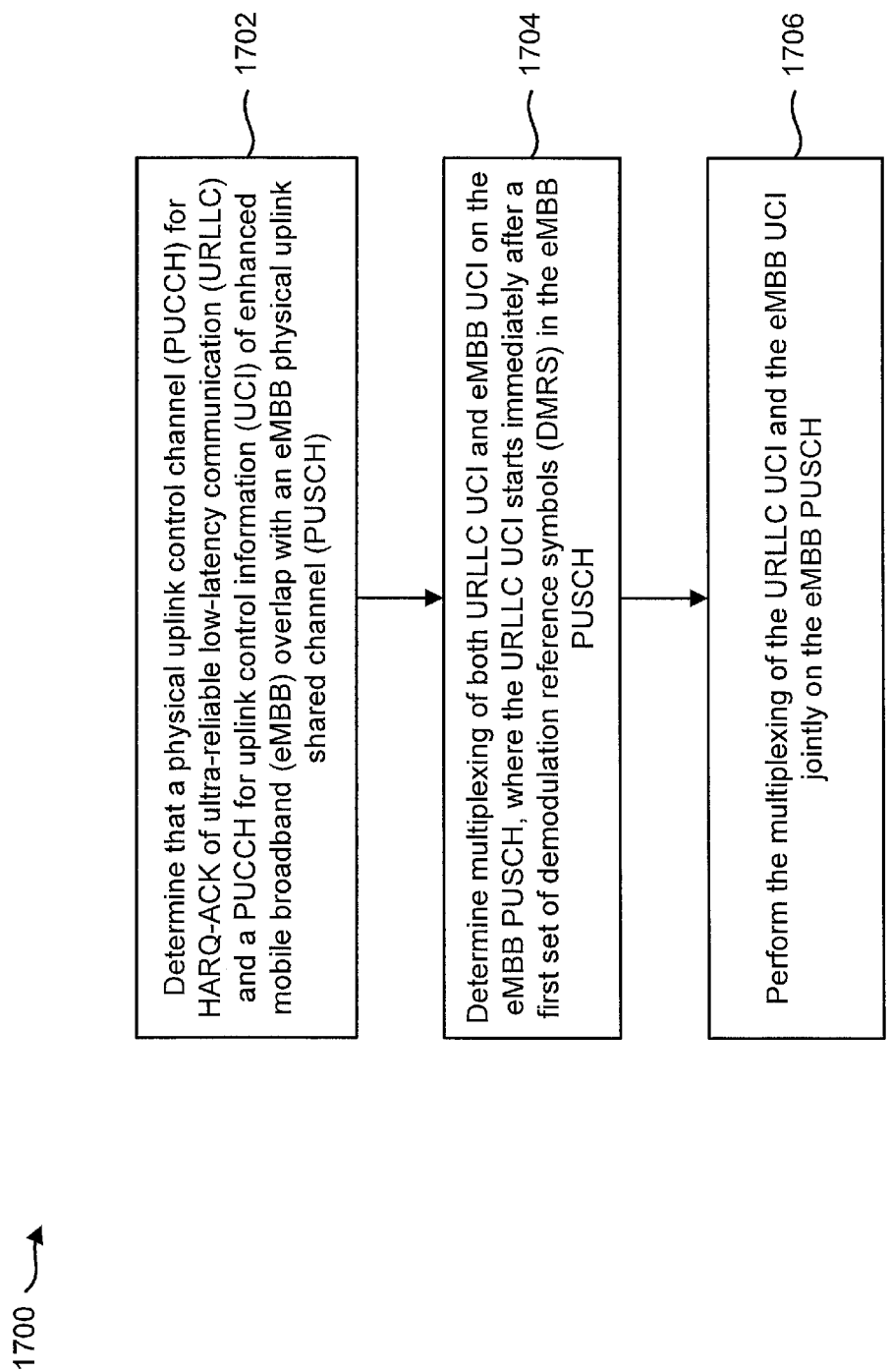
FIG. 17 is a flow diagram illustrating a communication method by a UE.

FIG. 17 is a flow diagram illustrating a communication method 1700 by a UE 102. The UE 102 may determine 1702 that a physical uplink control channel (PUCCH) for HARQ-ACK of ultra-reliable low-latency communication (URLLC) and a PUCCH for uplink control information (UCI) of enhanced mobile broadband (eMBB) overlap with an eMBB physical uplink shared channel (PUSCH). The UE 102 may determine 1704 multiplexing of both URLLC UCI and eMBB UCI on the eMBB PUSCH, where the URLLC UCI starts immediately after a first set of demodulation reference symbols (DMRS) in the eMBB PUSCH. The UE 102 may perform 1706 the multiplexing of the URLLC UCI and the eMBB UCI jointly on the eMBB PUSCH.

In some examples, the URLLC HARQ-ACK multiplexing on PUSCH conditions may be restricted to the case where the URLLC HARQ-ACK and eMBB HARQ-ACK and/or CSI multiplexing always start immediately after the first set of DMRS in a PUSCH. If both HARQ-ACK of URLLC and HARQ-ACK of eMBB are present, for HARQ-ACK multiplexing, the HARQ-ACK payload may be calculated based on the total payload of URLLC HARQ-ACK and eMBB HARQ-ACK.

In a special case, if URLLC HARQ-ACK has 1 bit and eMBB HARQ-ACK also has 1 bit, the total HARQ-ACK payload is 2 bits. The HARQ-ACK multiplexing may treat the multiplexed 2 bits of HARQ-ACK as URLLC HARQ-ACK. Thus, the number of symbols on the PUSCH for HARQ-ACK multiplexing may be calculated with the beta offset value configured for URLLC HARQ-ACK.

In another approach, for a HARQ-ACK with no more than 2 bits, 2 bits is used to determine the payload. Thus, the total payload is always more than 2 bits if both HARQ-ACK for URLLC and HARQ-ACK for eMBB are present.

If the total number of HARQ-ACK bits is more than 2, for UCI multiplexing on PUSCH, the HARQ-ACK of URLLC and HARQ-ACK of eMBB may be coded separately. The coded bits for transmission on PUSCH may be calculated separately based on the different beta offset settings for URLLC HARQ-ACK and eMBB HARQ-ACK, respectively. The UCI multiplexing may then be performed in the following order: coded bits for URLLC HARQ-ACK is multiplexed first, followed coded bits for eMBB HARQ-ACK, then the coded bits for CSI part 1 and coded bits for CSI part 2 if present.

If frequency hopping is not configured for the PUSCH, and if HARQ-ACK is present for transmission on the PUSCH, let $G^{ACK}(1)=G^{ACK}=G^{ACK-part1}+G^{ACK-part2}$. The UCI multiplexing may be performed in the following order: coded bits for URLLC HARQ-ACK is multiplexed first, followed by coded bits for eMBB HARQ-ACK, then the coded bits for CSI part 1 and coded bits for CSI part 2 if present.

If frequency hopping is configured for the PUSCH, the total HARQ-ACK coded bits multiplexed on the first hop may be determined based on the maximum between the number of symbols for subslot based HARQ-ACK codebook and half of the total symbols for subslot based HARQ-ACK and slot based HARQ-ACK. Consequently, the remaining HARQ-ACK coded bits for slot based HARQ-ACK may be multiplexed on the second hop. For frequency hopping, the following equations may be used:

$$G^{ACK}(1)=\max(G^{ACK\text{-}part1} N_L \cdot Q_m \cdot [G^{ACK}/(2 \cdot N_L \cdot Q_m)]);$$

$$G^{ACK}(2)=\min(G^{ACK\text{-}part2}, N_L \cdot Q_m \cdot [G^{ACK}/(2 \cdot N_L \cdot Q_m)])=G^{ACK}-G^{ACK}(1);$$

$$G^{ACK\text{-}part1}(1)=G^{ACK\text{-}part1} \text{ and } G^{ACK\text{-}part1}(2)=0; \text{ and}$$

$$G^{ACK\text{-}part2}(1)=G^{ACK}(1)-G^{ACK\text{-}part1} \text{ and } G^{ACK\text{-}part2}(2)=G^{ACK}(2).$$

Within each hop, the UCI multiplexing can then be performed following the order of HARQ-ACK, CSI-part1 and CSI-part2. In the first hop, all coded bits of a subslot based HARQ-ACK may be multiplexed first, followed by a segment of coded bits for eMBB HARQ-ACK if $G^{ACK\text{-}part1} < G^{ACK\text{-}part2}$, then the coded bits for CSI part 1 and coded bits for CSI part 2 if present. In the second hop, remaining coded bits of slot based HARQ-ACK is multiplexed first, followed by the coded bits for CSI part 1 and coded bits for CSI part 2 if present.

Similar methods can be used to derive the number of coded HARQ-ACK bits in each hop if URLLC HARQ-ACK can be multiplexed only in the second hop.

Figure 18:
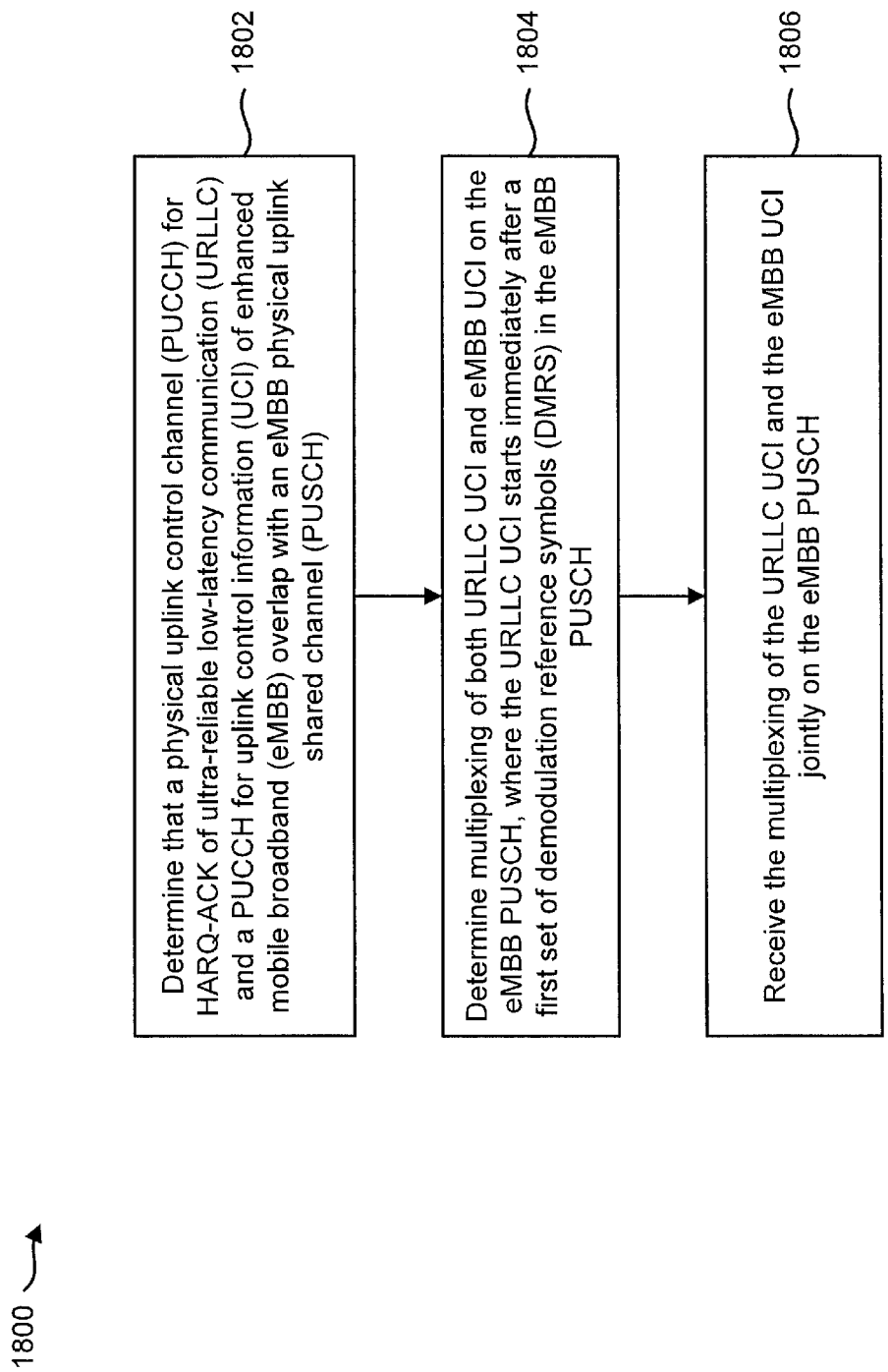
FIG. 18 is a flow diagram illustrating a communication method by a gNB.

FIG. 18 is a flow diagram illustrating a communication method 1800 by a gNB 160. The gNB 160 may determine 1802 that a physical uplink control channel (PUCCH) for HARQ-ACK of ultra-reliable low-latency communication (URLLC) and a PUCCH for uplink control information (UCI) of enhanced mobile broadband (eMBB) overlap with an enhanced mobile broadband (eMBB) physical uplink shared channel (PUSCH). The gNB 160 may determine 1804 multiplexing of both URLLC uplink control information (UCI) and eMBB UCI on the eMBB PUSCH, where the URLLC UCI starts immediately after a first set of demodulation reference symbols (DMRS) in the eMBB PUSCH. The gNB 160 may receive 1806 the multiplexing of the URLLC UCI and the eMBB UCI jointly on the eMBB PUSCH.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

CROSS REFERENCE

This Nonprovisional application claims priority under 35 U.S.C. § 119 on provisional Application No. 62/882,952 on Aug. 5 2019, the entire contents of which are hereby incorporated by reference.

What is claimed is:

1. A user equipment (UE), comprising:
a multiplexing processor configured to:
determine that a first physical uplink control channel (PUCCH) for a hybrid automatic repeat request-acknowledgment (HARQ-ACK) of a first priority and a second PUCCH for a HARQ-ACK of a second priority overlap with a physical uplink shared channel (PUSCH); and
multiplex the HARQ-ACK of the first priority and the HARQ-ACK of the second priority; and
transmitting circuitry configured to transmit the multiplexed HARQ-ACK of the first priority and HARQ-ACK of the second priority on the PUSCH.

2. The UE of claim 1,
wherein the HARQ-ACK of the first priority and the HARQ-ACK of the second priority are coded separately,
coded bits for a transmission on the PUSCH are calculated separately based on different beta offset settings for the HARQ-ACK of the first priority and the HARQ-ACK of the second priority, and
the coded bits for the HARQ-ACK of the first priority are multiplexed first, followed by the coded bits for the HARQ-ACK of the second priority.

3. A base station, comprising:
a multiplexing processor configured to determine that a first physical uplink control channel (PUCCH) for a hybrid automatic repeat request-acknowledgment (HARQ-ACK) of a first priority and a second PUCCH for a HARQ-ACK of a second priority overlap with a physical uplink shared channel (PUSCH); and
receiving circuitry configured to receive the HARQ-ACK of the first priority and the HARQ-ACK of the second priority that are multiplexed on the PUSCH.

4. The base station of claim 3,
wherein the HARQ-ACK of the first priority and the HARQ-ACK of the second priority are coded separately,
coded bits for a transmission on the PUSCH are calculated separately based on different beta offset settings for the HARQ-ACK of the first priority and the HARQ-ACK of the second priority, and
the coded bits for the HARQ-ACK of the first priority are multiplexed first, followed by the coded bits for the HARQ-ACK of the second priority.

5. A method performed by a user equipment (UE), the method comprising:
determining that a first physical uplink control channel (PUCCH) for a hybrid automatic repeat request-acknowledgment (HARQ-ACK) of a first priority and a second PUCCH for a HARQ-ACK of a second priority overlap with a physical uplink shared channel (PUSCH);
multiplexing the HARQ-ACK of the first priority and the HARQ-ACK of the second priority; and
transmitting the multiplexed HARQ-ACK of the first priority and HARQ-ACK of the second priority on the PUSCH.

* * * * *